United States Patent
Mori et al.

(10) Patent No.: US 8,760,377 B2
(45) Date of Patent: Jun. 24, 2014

(54) SEMI-TRANSMISSIVE LIQUID CRYSTAL DISPLAY DEVICE

(75) Inventors: Kenichi Mori, Kanagawa (JP); Michiaki Sakamoto, Kanagawa (JP)

(73) Assignee: NLT Technologies, Ltd., Kanagawa (JP)

(*) Notice: Subject to any disclaimer, the term of this patent is extended or adjusted under 35 U.S.C. 154(b) by 1029 days.

(21) Appl. No.: 12/827,457

(22) Filed: Jun. 30, 2010

(65) Prior Publication Data

US 2011/0001690 A1 Jan. 6, 2011

(30) Foreign Application Priority Data

Jul. 1, 2009 (JP) .................. 2009-157349

(51) Int. Cl.
G09G 3/36 (2006.01)

(52) U.S. Cl.
USPC ........................................................ 345/87

(58) Field of Classification Search
USPC ........................................................ 345/87
See application file for complete search history.

(56) References Cited

U.S. PATENT DOCUMENTS

| | | | |
|---|---|---|---|
| 2005/0018113 A1 | 1/2005 | Shen et al. | |
| 2007/0001941 A1* | 1/2007 | Umezaki et al. | 345/77 |
| 2007/0002226 A1* | 1/2007 | Sakamoto et al. | 349/114 |
| 2009/0009447 A1* | 1/2009 | Naka et al. | 345/87 |

FOREIGN PATENT DOCUMENTS

| | | |
|---|---|---|
| CN | 1892349 A | 1/2007 |
| CN | 1924647 A | 3/2007 |
| CN | 101046943 A | 10/2007 |
| CN | 101308293 A | 11/2008 |
| JP | 05-134629 A | 5/1993 |
| JP | 2003-344837 A | 12/2003 |
| JP | 2005-338256 A | 12/2005 |
| JP | 2007-041572 A | 2/2007 |
| JP | 2007-127933 A | 5/2007 |
| JP | 2008-065216 A | 3/2008 |

OTHER PUBLICATIONS

Office Action issued by Japanese Patent Office in Japanese Patent Application No. 2009-157349 dated Feb. 19, 2013.
Office Action issued by Chinese Patent Office in Chinese Application No. 201010221152.6 dated Jan. 16, 2013.

* cited by examiner

*Primary Examiner* — Latanya Bibbins
(74) *Attorney, Agent, or Firm* — Sughrue Mion, PLLC

(57) ABSTRACT

In a liquid crystal panel, a reflective pixel electrode and a transmissive pixel electrode in a unit pixel are supplied with an image signal output from a data line drive circuit, the two mutually different scanning signals output from a scanning line drive circuit, and common signals output from a common line drive circuit. The phase of the image signal is set different from that of the common signal. Further, a period during which the two scanning signals are selected is set in one horizontal period, the ending of the selection period for one of the scanning signals is set to a point in time before an electrical potential of the common signal changes, and the ending of the selection period for the other scanning signal is set to a point in time after the electrical potential of the common signal changes.

2 Claims, 18 Drawing Sheets

SEMI-TRANSMISSIVE LIQUID CRYSTAL DISPLAY DEVICE

INCORPORATION BY REFERENCE

This application is based upon and claims the benefit of priority from Japanese Patent Application No. 2009-157349, filed on Jul. 1, 2009, the disclosure of which is incorporated herein in its entirely by reference.

BACKGROUND OF THE INVENTION

1. Field of the Invention

The present invention relates to a semi-transmissive Liquid crystal display device (LCD) that can improve display performance further while inhibiting an increase in dissipation power.

2. Description of the Related Art

As an LCD that combines functions of a transmissive LCD and those of a reflective LCD, a semi-transmissive LCD is known which type has a transmissive region and a reflective region in each of pixels. The transmissive region transmits light from a backlight light source used as a display light source and so can give good display in a relatively dark environment such as an indoor or dark room. The reflective region has a reflector plate so that external light reflected by this reflector plate may serve as a display light source and so can give good display in a relatively bright light environment such as the outdoors.

The LCD mounted in cellular phones and Personal Digital Assistances (PDAs) should preferably be semi-transmissive because it is used in a variety of environments covering indoor and outdoor environments. Further, the semi-transmissive LCD is capable of switching off the backlight light source as necessary and can save on dissipation power.

It is to be noted that LCDs has lateral field modes such as an In Plane Switching (IPS) mode and a Field Fringe Switching (FFS) mode. The lateral field mode LCD has a pixel electrode and a common electrode formed on the same substrate so that a lateral field may be applied to a liquid crystal layer. This lateral field mode LCD displays an image by turning liquid crystal molecules into a direction parallel with the substrate, thereby enabling realizing a wide viewing angle as compared to a Twisted Nematic (TN) mode LCD.

An LCD that combines the lateral field mode and the semi-transmissiveness is also developed and proposed.

In the lateral field mode semi-transmissive LCD, if its transmissive region is driven in a normally black mode, the reflective region is driven in a normally white mode, so that the transmissive region and the reflective region are opposite of each other in terms of light and darkness. Technologies to prevent the light-dark reversal are also under development. The related arts are described in, for example, Japanese Patent Application Publications, No. 2003-344837 (hereinafter, referred to as Related Art Patent Document 1) and No. 2005-338256 (hereinafter, referred to as Related Art Patent Document 2). The Related Art Patent Document 1 describes a configuration of the lateral field mode LCD in which an embedded retardation layer is disposed in the reflective region and the Related Art Patent Document 2 describes a configuration of the lateral field mode LCD in which a retardation film is disposed all over the transmissive region and the reflective region.

If the embedded retardation layer described in the Related Art Patent Document 1 is used, a problem occurs in that manufacturing steps for forming this embedded retardation layer will be increased greatly. Moreover, another problem occurs in that wavelength dispersiveness of the embedded retardation layer will disable realizing complete black when the reflective region is in the black display condition and so deteriorate contrast. On the other hand, if the retardation film described in the Related Art Patent Document 2 is used, a problem occurs in that in the transmissive region, the liquid crystal layer will have a smaller gap margin to resultantly decrease contrast and a viewing angle against changes in gap of the liquid crystal layer, thereby disabling sufficiently obtaining high contrast and wide-viewing angle characteristics in the lateral field mode.

Besides those, such technologies are proposed as to prevent light-dark reversal by improving the driving method without using the retardation film or the embedded retardation layer in the lateral field mode semi-transmissive LCDs (for example, Japanese Patent Application Publications, No. 2007-127933 (hereinafter, referred to as Related Art Patent Documents 3) and No. 2007-041572 (hereinafter, referred to as Related Art Patent Documents 4).

In these types of semi-transmissive LCDs, the transmissive region is driven in the normally black mode and the reflective region is driven in the normally white mode. The improved driving method mainly features that common electrodes (facing each other) are formed for the transmissive region and the reflective region independently of each other. Those common electrodes are supplied with common signals (reference voltages) different from each other so that different potentials can be applied to those common electrodes, thereby preventing light-dark reversal. Those setups enable obtaining high contrast and wide-viewing angle characteristics in the transmissive region in the lateral field mode and, further, realizing a lateral field mode semi-transmissive LCD that need not increase the manufacturing steps significantly.

However, there are a few problems in lateral field mode LCDs of the Related Art Patent Documents 3 and 4 in which a driving method is improved.

According to the Related Art Patent Document 3, in each sub-pixel, a planar common electrode is divided into two portions for the transmissive region and the reflective region respectively so that different reference voltages may be applied to the common electrode portion for the transmissive region and that for the reflective region.

When special attention is paid to, for example, the n-th display line, in each of the sub-pixels on the n-th display line, the common electrode in the reflective region is supplied with a HIGH level reference voltage and that in the transmissive region is supplied with a LOW level reference voltage. Further, the common electrode in the transmissive region aligned in the n-th display line is commonly used as the common electrode in the reflective region aligned in the (n+1)-th display line. When the n-th display line is being scanned, a potential somewhere between the LOW and HIGH levels is written to the pixel electrode, so that the pixels on the n-th display line have the same polarity. The polarity refers to the level of a potential at the pixel electrode with respect to that at the facing electrode, so that the polarity is positive if the pixel electrode has a higher potential than the common electrode and negative if it is reverse.

On the (n+1)-th display line, the common electrode in the reflective region is supplied with the LOW level reference voltage, so that the polarity at the reflective region on the (n+1)-th display line is opposite of that on the n-th reflective region. Similarly, the polarity at the transmissive region is opposite between the neighboring display lines.

As may be clear from this explanation, the driving method according to the Related Art Patent Document 3 involves gate line reversal driving, which driving deteriorates display qualities because it gives rise to lateral unevenness and flickering, so that dot reversal driving must be employed which gives an excellent display quality.

Further, since each sub-pixel has two common electrodes, to prevent short-circuiting, it is necessary to increase the distance between the common electrode for the transmissive region and that for the reflective region. This distance has an influence on the magnitude of a numerical aperture, especially if a pitch between the unit pixels is reduced. Accordingly, it is necessary to integrate the common electrode required into one which is common to the transmissive region and the reflective region in order to inhibit a decrease in numerical aperture, that is, display luminance.

According to the Related Art Patent Document 4, similar to the Related Art Patent Document 3, a common electrode is disposed to each of the transmissive region and the reflective region so that different common signals may be applied to those different common electrodes. Since the pixel electrode is supplied with a potential somewhere between the LOW and HIGH levels of the common signal, so that similar to the Related Art Patent Document 3, this approach also involves gate line reversal driving.

However, the Related Art Patent Document 4 describes a means configured to change the driving method from gate line reversal to dot reversal excellent in display quality and a means configured to integrate a common electrode required into one which is common to the transmissive region and the reflective region.

The means configured to change the driving scheme to dot reversal is to set a signal applied to the common electrode to a fixed potential and provide scanning lines for both the transmissive region and the reflective region. In accordance with periods during which the scanning line signals for the transmissive region and the reflective region are selected, the potential of an image signal that provides an electrical potential to be written to the pixel electrode is changed in each of the selected periods. This setup enables changing the polarity of the potential of the image signal for each of the vertical display lines, thereby performing dot reversal driving and also reducing count of the common electrodes required to one.

The other means configured to reduce count of the common electrodes required to one is to provide scanning lines for both the transmissive region and the reflective region, permitting the potential of the common electrode to change not in one horizontal period but in half this period. That is, the potential of the common electrode is held at the HIGH level during a period when the scanning line signal for the transmissive region is selected and at the LOW level during a period when the scanning line signal for the reflective region is selected. This setup enables the potential of the common electrode signal to be different between the transmissive region and the reflective region when writing the image signal potential to the pixel electrode, thereby integrating the common electrodes required into one which is common to the transmissive region and the reflective region.

However, even those tentative schemes have the following problems. According to the means configured to change the driving method from gate line reversal to dot reversal, the potential of the common electrode is fixed. Accordingly, it is necessary to enlarge the amplitude of the image signal, so that more electric power will be dissipated. On the other hand, according to the other means configured to integrate the common electrodes required into one which is common to the transmissive region and the reflective region, the signal applied to this common electrode needs an increased drive frequency, so that more electric power will be dissipated all the same.

SUMMARY OF THE INVENTION

In view of the above, it is an object of the present invention to provide a semi-transmissive LCD that has an improved display quality with no increase in drive frequency of a signal to be applied nor increase in amplitude of this signal while inhibiting an increase in dissipation power.

According to a first aspect of the present invention, there is provided a semi-transmissive liquid crystal display device including:
a liquid crystal layer;
a first substrate;
a second substrate facing the first substrate via the liquid crystal layer sandwiched between the first substrate and the second substrate;
a plurality of unit pixels arranged in a form of a matrix array, the unit pixels each including a transmissive region made up of a transmissive pixel electrode and a reflective region made up of a reflective pixel electrode;
a plurality of first scanning lines each connected to a first switching element formed in each of the corresponding transmissive regions;
a plurality of second scanning lines each connected to a second switching element formed in each of the corresponding reflective regions; and
a common electrode to which a common signal is applied,
wherein a phase of an image signal applied to the pixel electrode is set different from a phase of the common signal applied to the common electrode;
wherein the plurality of the first scanning lines, the plurality of the second scanning lines, the transmissive pixel electrode for the transmissive region, the reflective pixel electrode for the reflective region, a common electrode are formed on the same first substrate; and
wherein an ending of the first (or second) period of time for the first (or second) scanning signal applied to the first (or second) scanning line is set to a point in time before an electrical potential of the common signal changes and an ending of the second (or first) period of time for the second (or first) scanning signal applied to the second (or first) scanning line is set to a point in time after an electrical potential of the common signal changes.

With the above configuration, it is possible to eliminate the need for enlarging the amplitude of a signal applied to the pixel electrodes or increasing the drive frequency of the signal applied to the common electrode and so improves the display quality of a semi-transmissive LCD while inhibiting an increase in dissipation power.

DESCRIPTION OF THE PREFERRED EMBODIMENTS

First Exemplary Embodiment

According to a first exemplary embodiment of the present invention, there is provided a semi-transmissive liquid crystal display device including: a plurality of unit pixels arranged in a form of a matrix array, the unit pixels each including a transmissive region made up of a transmissive pixel electrode and a reflective region made up of a reflective pixel electrode; a plurality of first scanning lines each connected to a first switching element formed in each of the corresponding transmissive regions; a plurality of second scanning lines each connected to a second switching element formed in each of the corresponding reflective regions; a first common electrode formed in the unit pixels aligned in an odd-numbered column; and a second common electrode formed in the unit pixels aligned in an even-numbered column, the plurality of the first scanning lines, the plurality of the second scanning lines, the transmissive pixel electrode for the transmissive region, the reflective pixel electrode for the reflective region, a first common electrode, and a second common electrode are formed on the same first substrate, and wherein the first common electrode is electrically isolated from the second common electrode.

Figure 1:
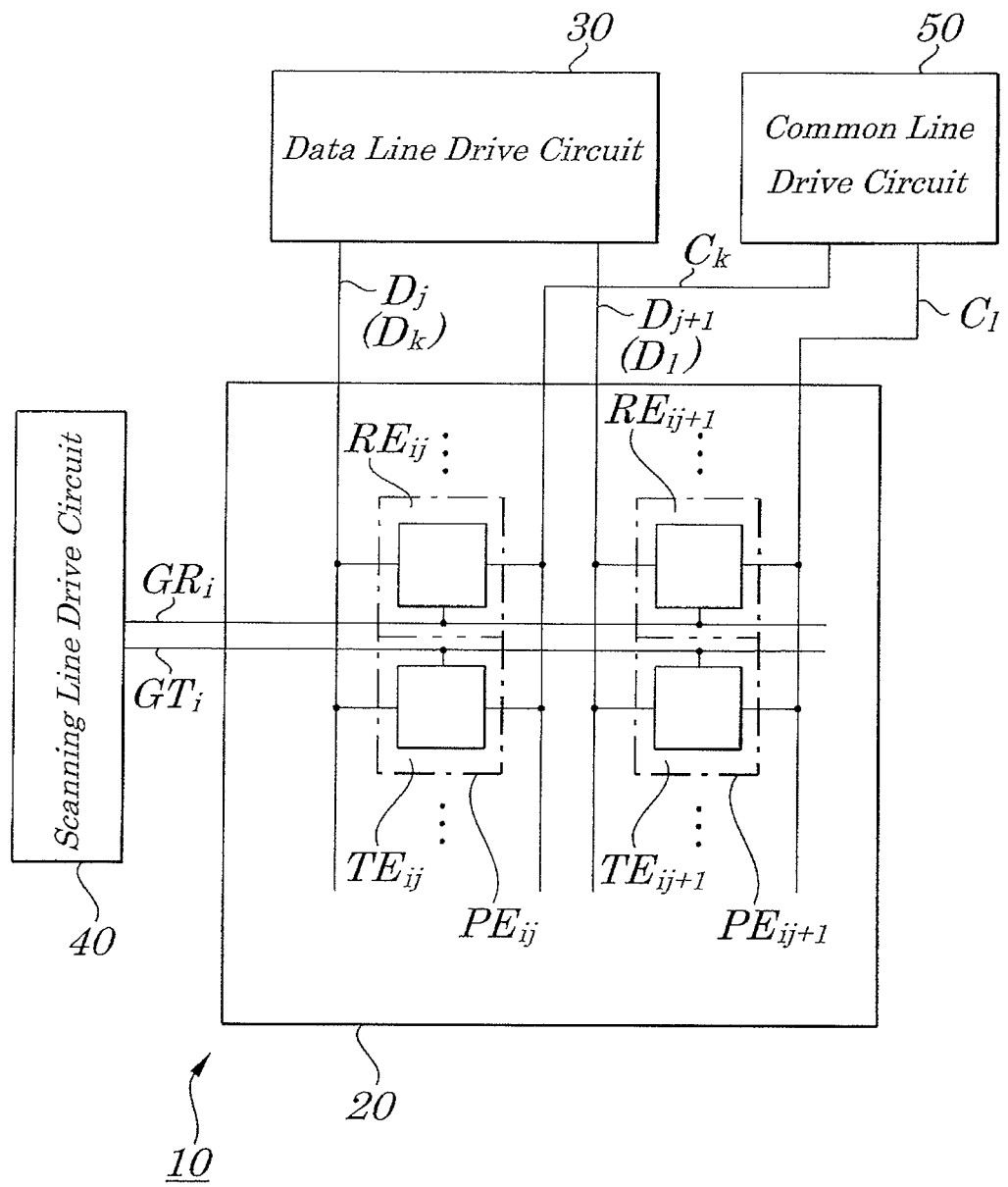
FIG. 1 is a block diagram for showing electrical configurations of a lateral field mode semi-transmissive LCD according to a first exemplary embodiment of the present invention.
Figure 2:
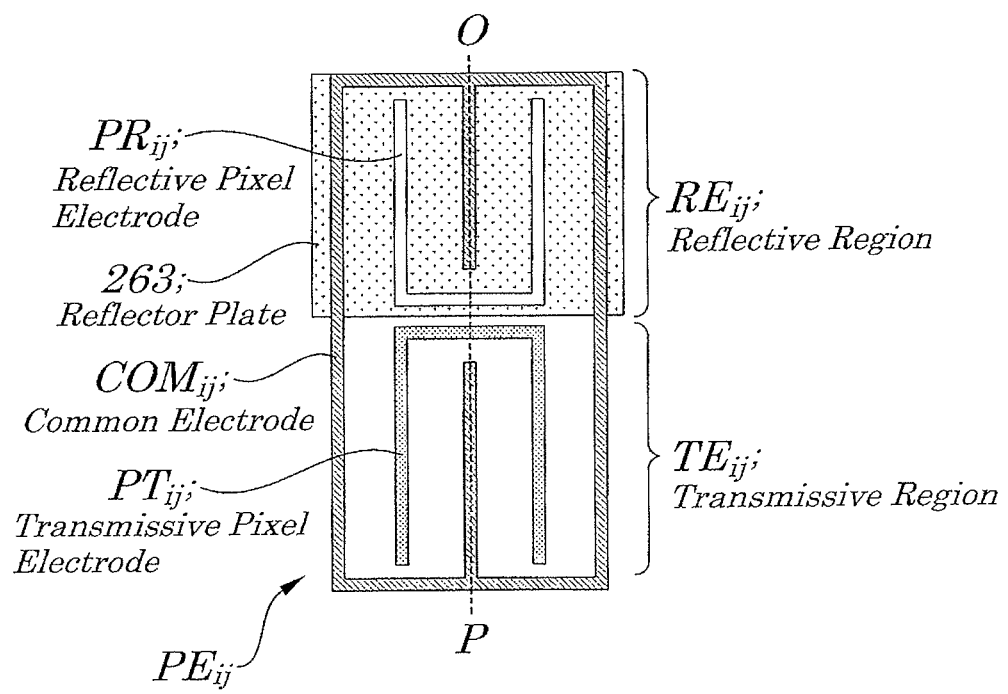
FIG. 2 is a plan view for showing a unit pixel in the lateral field mode semi-transmissive LCD.
Figure 3:
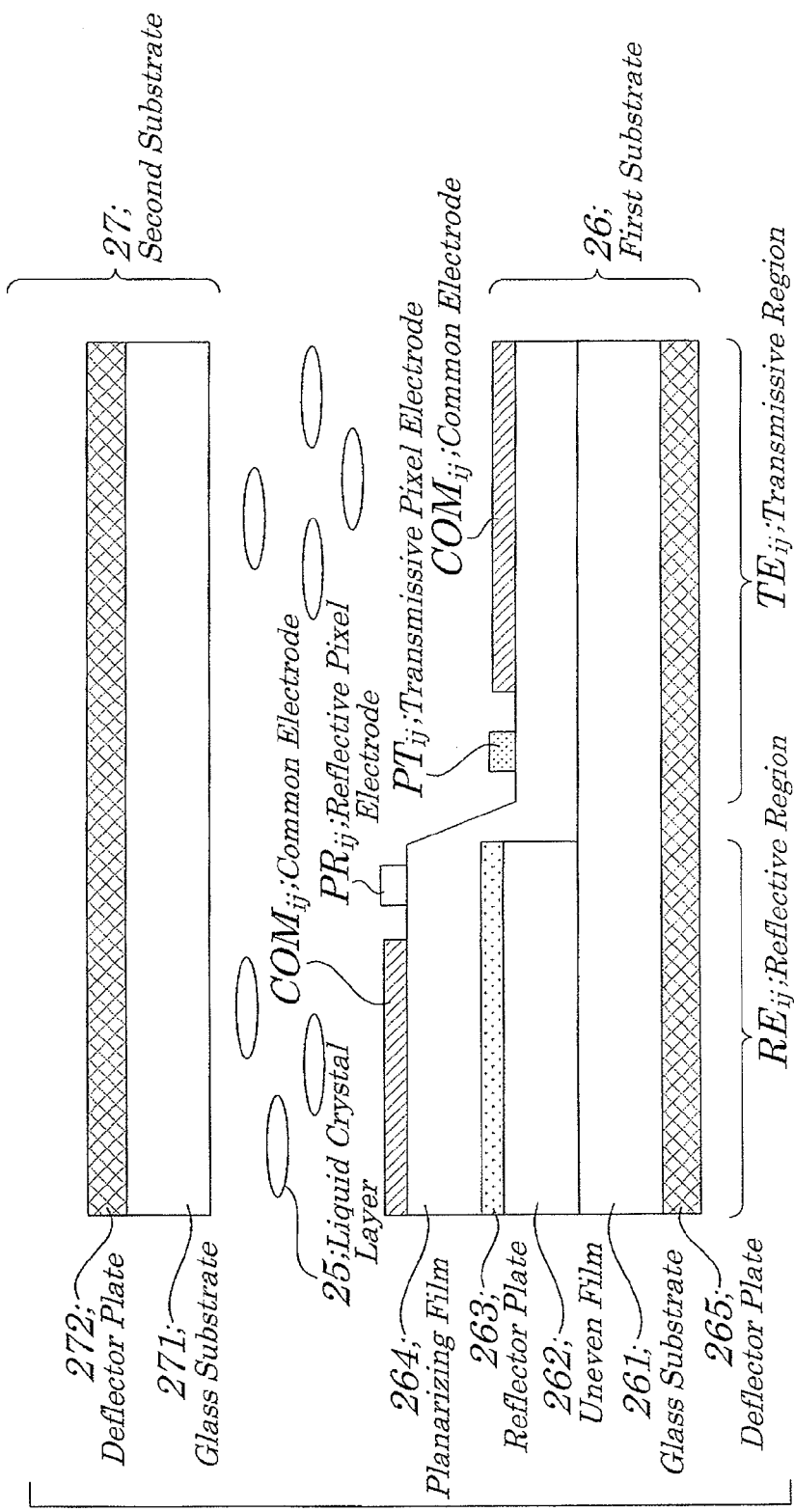
FIG. 3 is a cross-sectional view of the unit pixel taken along line O-P of FIG. 2.
Figure 4:
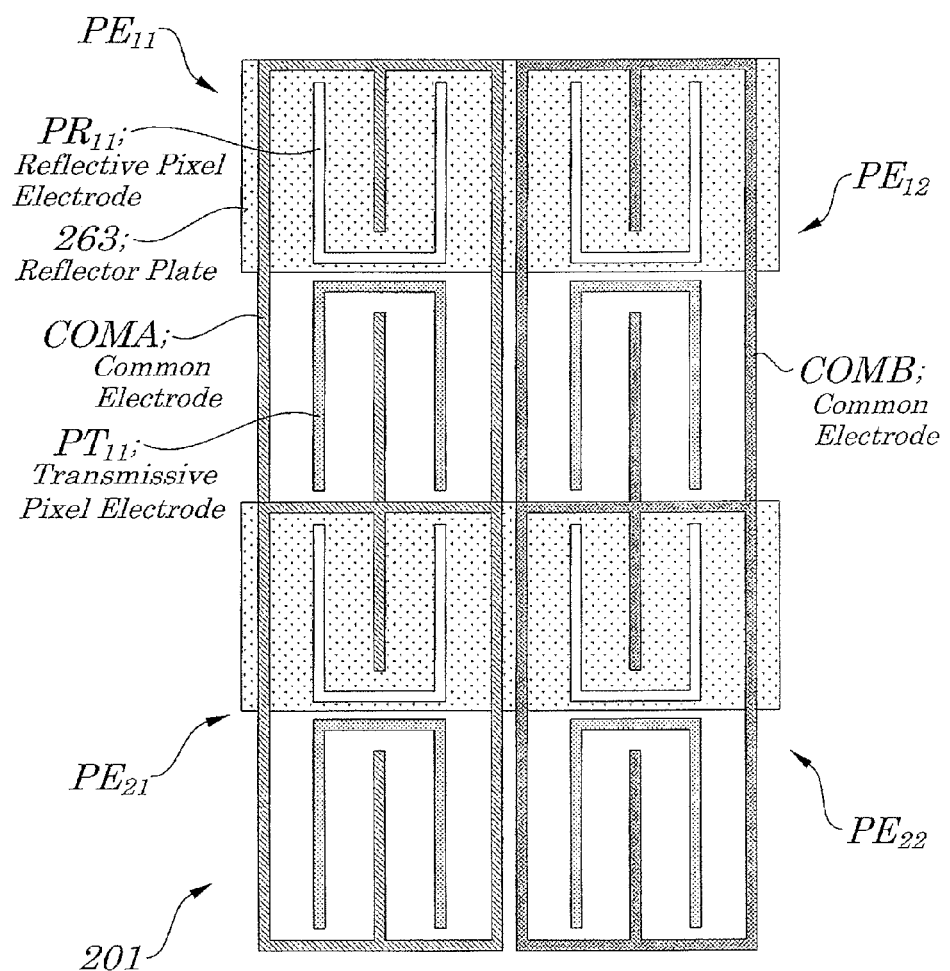
FIG. 4 is a plan view for showing the unit pixels shown in FIG. 2 in a form of a matrix array with two rows and two columns.
Figure 5:
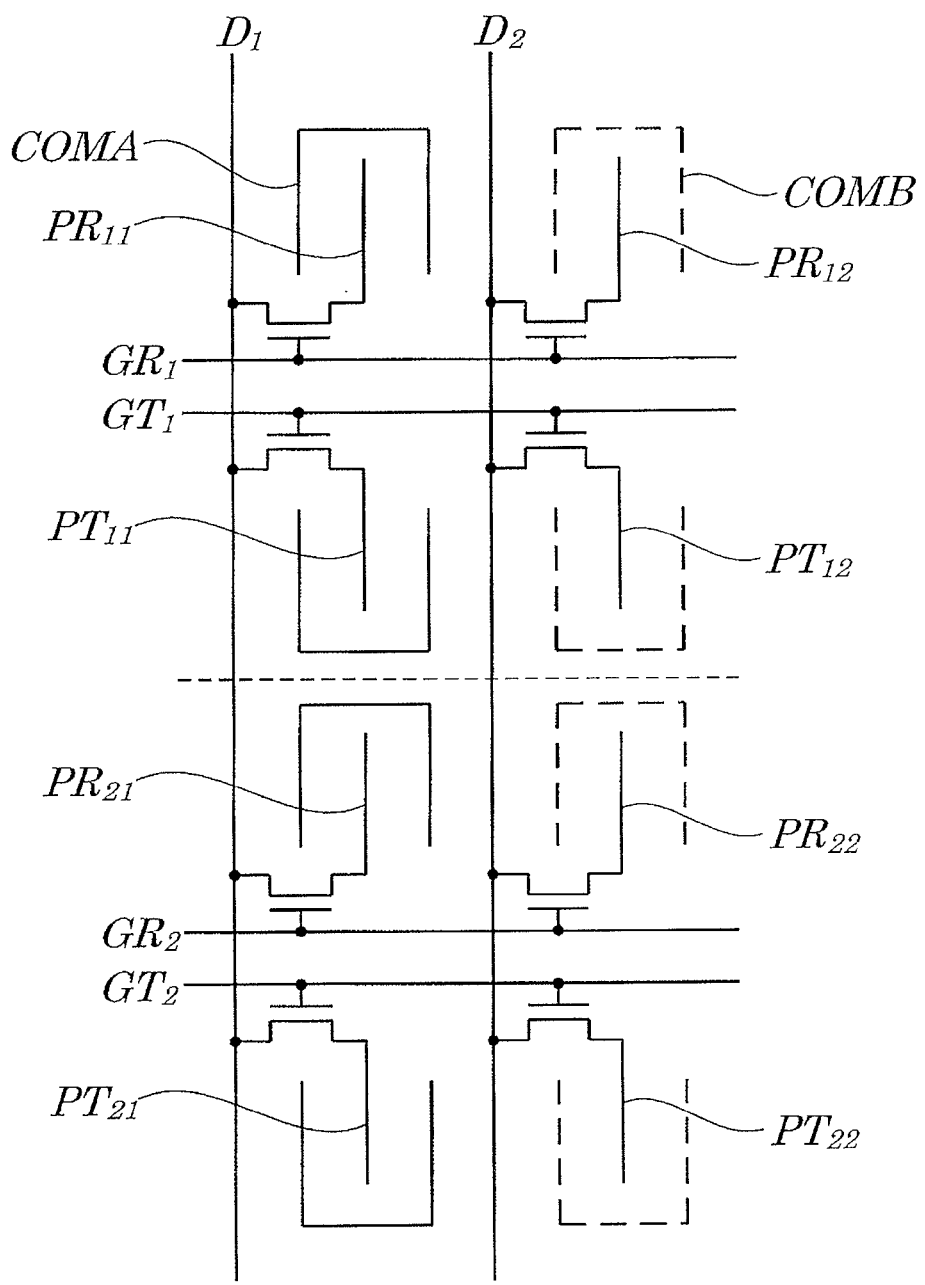
FIG. 5 is a circuit diagram for showing an equivalent circuit of the unit pixel in a form of a matrix array with two rows and two columns shown in FIG. 2.
Figure 6:
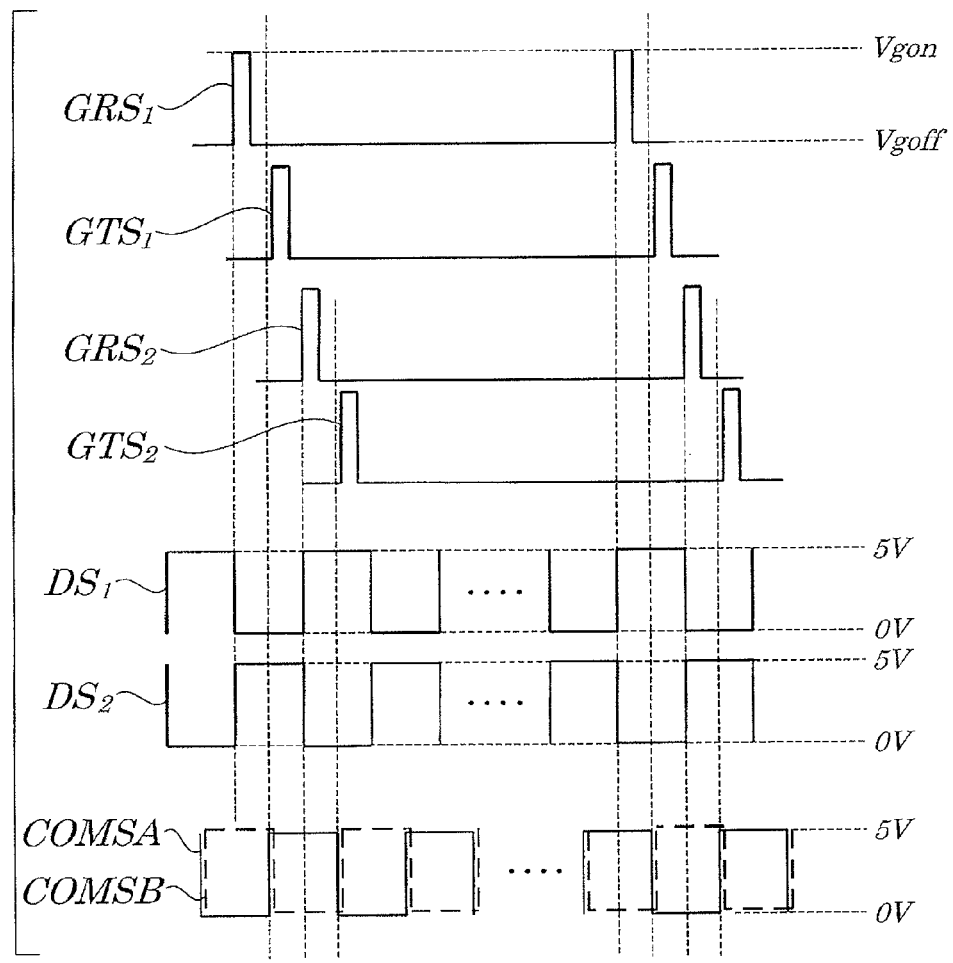
FIG. 6 is a waveform chart of signals applied to electrodes and interconnections in a case where white display is provided on the semi-transmissive LCD of the first exemplary embodiment.
Figure 7:
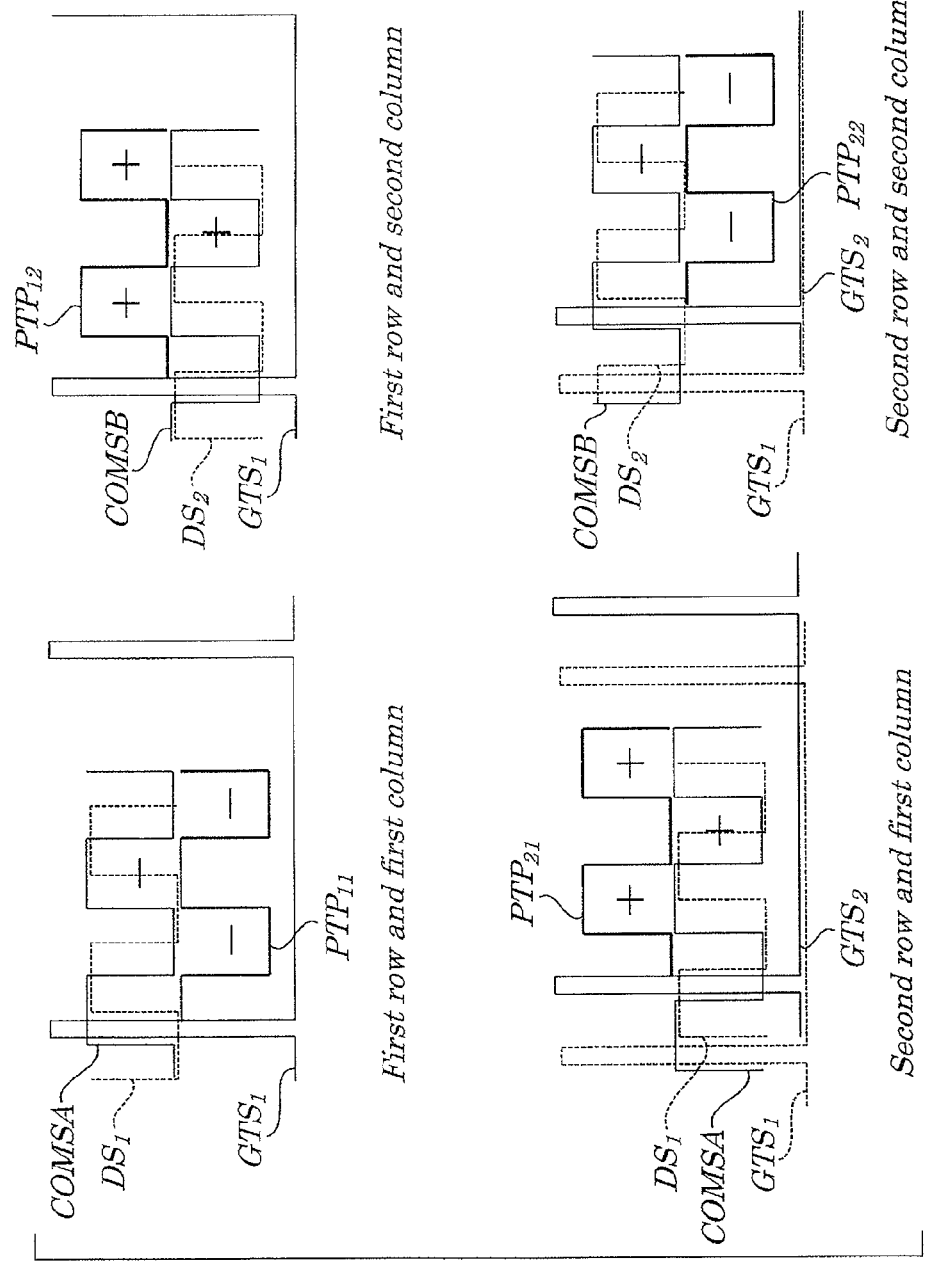
FIG. 7 is a chart for showing a change in potential of transmissive pixel electrodes in the case where white display is provided on the semi-transmissive LCD of the first exemplary embodiment.

FIG. 1 is a block diagram for showing electrical configurations of a lateral field mode semi-transmissive liquid crystal display device (LCD) according to the first exemplary embodiment of the present invention, FIG. 2 is a plan view for showing a unit pixel in the lateral field mode semi-transmissive LCD, FIG. 3 is a cross-sectional view of the unit pixel taken along line O-P of FIG. 2, FIG. 4 is a plan view for showing the unit pixels shown in FIG. 2 in a form of a matrix array with two rows and two columns, FIG. 5 is a diagram for showing an equivalent circuit of the unit pixels in a form of a matrix array with two rows and two columns shown in FIG. 2, FIG. 6 is a chart of an example of the waveforms of signals applied to electrodes and interconnections in a case where white display is provided on the semi-transmissive LCD of the first exemplary embodiment, and FIG. 7 is a chart for showing a change in potential of transmissive pixel electrodes in the case where white display is provided on the semi-transmissive LCD of the first exemplary embodiment.

As shown in FIG. 1, a lateral field mode semi-transmissive LCD 10 of the present exemplary embodiment roughly includes a liquid crystal panel 20, a data line drive circuit 30, a scanning line drive circuit 40, and a common line drive circuit 50; the semi-transmissive LCD 10 is capable of displaying an image while inhibiting an increase in dissipation power, in which a difference in potential between a common electrode and a pixel electrode is made different between a transmissive region and a reflective region of the unit pixel so that light-bright reversal may be prevented from occurring between the transmissive region and the reflective region for the purpose of normal driving in the lateral field mode and also the polarity of a writing potential is made opposite between the neighboring pixel electrodes for the purpose of dot reversal driving. In the semi-transmissive LCD 10, in each unit pixel in the liquid crystal panel 20, if the reflective region is driven in the normally white mode, the transmissive region will be driven in the normally black mode so that different voltages may be applied to a liquid crystal layer in the reflective region and that in the transmissive region.

As shown in FIG. 3, the liquid crystal panel 20 includes a first substrate 26, a liquid crystal layer 25, and a second substrate 27. Unit pixel regions (hereinafter referred to as unit pixels) $PE_{ij}$ ("i" is one of 1, 2, . . . , and m as explained hereafter, and "j" is one of 1, 2, . . . , and n as explained hereafter) is arrayed on the first substrate 26, in a form of a matrix with m rows and n columns ("m" is one of 1, 2, . . . , and "n" is one of 1, 2, . . . ).

Each of the unit pixels $PE_{ij}$ includes a reflective region $RE_{ij}$ and a transmissive region $TE_{ij}$ as shown in FIGS. 1-3.

As shown in FIG. 2, the reflective region $RE_{ij}$ has a reflective electrode (hereinafter referred to as a reflective pixel electrode) $PR_{ij}$ disposed therein and the transmissive region $TE_{ij}$ has a transmissive electrode (hereinafter referred to as a transmissive pixel electrode) $PT_{ij}$ placed therein. Further, the reflective region $RE_{ij}$ and the transmissive region $TE_{ij}$ have a common electrode $COM_{ij}$ common to them therein.

This FIG. 2 shows the unit pixel $PE_{ij}$ two-dimensionally and FIG. 3 shows this unit pixel $PE_{ij}$ three-dimensionally.

In the liquid crystal panel 20 having such a configuration, a data line $D_j$ that corresponds to the reflective pixel electrode $PR_{ij}$ for the reflective region $RE_{ij}$ and the transmissive region $TE_{ij}$ of the unit pixel $PE_{ij}$ is connected to an output that corresponds to the data line drive circuit 30, one common electrode $COM_{ik}$ (k=odd-numbered j) (FIG. 1) of the common electrodes $COM_{ij}$ (FIGS. 2 and 3) which are independently aligned in an even-numbered and an odd-numbered columns of the "n" pieces of columns of the above-mentioned matrix is connected via a common line $C_k$ to the corresponding output of the common line drive circuit 50, and one common electrode $COM_{il}$ (l=even-numbered j) (FIG. 1) of the common electrodes $COM_{ij}$ (FIGS. 2 and 3) is connected via a common line $C_l$ to the corresponding output of the common line drive circuit 50.

Further, as shown in FIG. 1, the reflective region $RE_{ij}$ and the transmissive region $TE_{ij}$ of each unit pixel $PE_{ij}$ respectively have their specific scanning lines $GR_i$ and $GT_i$ connected to the corresponding outputs of the scanning line drive circuit 40 and extended in a direction of the rows in the above-mentioned matrix. The scanning lines $GR_i$ and $GT_i$ supply, for each unit pixel $PE_{ij}$, scanning signals that control (to be described later) application of pixel signals supplied via the data line $D_j$ on the corresponding reflective region $RE_{ij}$ and the transmissive region $TE_{ij}$ respectively.

As described above, the liquid crystal panel 20 includes the liquid crystal layer 25 and a pair of the first substrate 26 and the second substrate 27 which sandwich the liquid crystal layer therebetween and which may be a pair of glass substrates or a like (FIG. 3).

On a glass substrate 261 of the first substrate 26, an uneven film 262 which has an irregular surface is formed corresponding to the reflective region $RE_{ij}$, on which the uneven film 262 a reflector plate 263 made of Al or a like is formed. The uneven film 262 has a function to adjust the thickness of the liquid crystal layer 25 in the reflective region $RE_{ij}$ and the transmissive region $TE_{ij}$. On the reflector plate 263, a planarizing film 264 made of a transparent insulator such as acryl is formed over both of the reflective region $RE_{ij}$ and the transmissive region $TE_{ij}$.

As shown in FIG. 3, on the planarizing film 264 are formed the common electrode $COM_{ij}$, the reflective pixel electrode $PR_{ij}$ for the reflective region $RE_{ij}$, and the transmissive pixel electrode $PT_{ij}$ for the transmissive region $TE_{ij}$. As shown in FIG. 2, these are formed in such a manner that the common electrode $COM_{ij}$ may face each of the reflective pixel electrode $PR_{ij}$ and the transmissive pixel electrode $PT_{ij}$. Further, the common electrode $COM_{ij}$, the reflective pixel electrode $PR_{ij}$, and the transmissive pixel electrode $PT_{ij}$ are formed from a transparent conductor such as an ITO (Indium Tin Oxide). It is to be noted that the common electrode $COM_{ij}$ and the reflective pixel electrode $PR_{ij}$ may be formed from a low-reflectivity conductor or a multilayer-structured film made of a conductor and its oxide. Furthermore, outside the glass substrate 261, a deflector plate 265 is disposed.

As shown in FIG. 1, on the first substrate 26, for each unit pixel $PE_{ij}$, the scanning line $GR_i$ for the reflective region $RE_{ij}$ is formed in the direction of the columns of the above-mentioned matrix and the scanning line $GT_i$ for the transmissive region $TE_{ij}$ is also formed in this direction of the columns. The data line $D_j$ is formed in this matrix column direction as intersecting with those two scanning lines $GR_i$ and $GT_i$. Near an intersection between the data line $D_j$ and each of the scanning lines $GR_i$ and $GT_i$, a switching element such as a TFT (Thin Film Transistor) is formed so that to a gate electrode (also referred to as scanning electrode) of this switching element, the scanning lines $GR_i$ and $GT_i$ may be connected.

Further, a source electrode of the switching element is formed in such a manner as to be connected to the data line $D_j$ and a drain electrode thereof is formed in such a manner as to be connected to the reflective pixel electrode $PR_{ij}$ and the transmissive pixel electrode $PT_{ij}$. Further, as necessary, a contact hole is formed. Furthermore, an oriented film is formed on a surface of the first substrate 26 which is in contact with the liquid crystal layer.

A glass substrate 271 of the second substrate 27 has a color filter and a black matrix formed thereon as necessary and the second substrate 27 has an oriented film formed on its surface which is in contact with the liquid crystal layer 25. Furthermore, outside the glass substrate 271, a deflector plate 272 is placed.

Subsequently, a description will be given of various kinds of drive circuits for the liquid crystal panel 20 with reference to FIG. 1.

The data line drive circuit 30 is used to supply the data line $D_j$ with an AC signal (image signal) $DS_j$, whose potential changes in one horizontal period of the unit pixel. The data line $D_j$ extends along the pixel regions that are arranged in the column direction in the liquid crystal panel.

The scanning line drive circuit 40 is used to supply scanning signals $GRS_i$ and $GTS_{ij}$ to the two scanning lines $GR_i$ and $GT_i$ respectively. The two scanning lines $GR_i$ and $GT_i$ extend along the pixel regions that are arranged in the row direction in the liquid crystal panel.

The common line drive circuit 50 is used to supply the common electrodes $COM_k$ and $COM_l$ (FIGS. 2 and 3) arranged in the odd-numbered and even-numbered columns in the above-mentioned matrix with an odd-numbered-column-specific common signal $COMS_k$ and an even-numbered-column-specific common signal $COMS_l$ via the common lines $C_k$ and $C_l$ specific to the odd-numbered and even-numbered columns respectively.

A description will be given below of those common signals, image signal, and scanning signals in terms of timing.

One of the common signals that is output from the common line drive circuit 50 and applied to the common electrodes aligned in the even-numbered column is obtained by essentially inverting the common signal that is applied to the common electrodes aligned in the odd-numbered column. The common signals are an AC signal whose potential, which is set somewhere between the HIGH and LOW levels of the common signals, changes in a period which corresponds to one horizontal period in which the image signal from the data line is written to the pixel electrodes aligned in each display line.

Further, the image signal applied to the data line is also an AC signal whose potential, which is set somewhere between the HIGH and LOW levels of the common signals, changes in a period which corresponds to one horizontal period.

Further, the image signal for the even-numbered column and that for the odd-numbered column are set so that they may be opposite in polarity of each other with respect to a reference voltage such as a GND, for example. The common signal and the image signal are set to have different phases and a phase difference between themselves smaller than $\pi$. Typically, the phase difference is set to $\pi/2$. The phase indicates a position in one period of a signal waveform which changes periodically; in the case of the image signal and the common signals in the present invention, the position at which the polarity changes from the positive (or negative) state to the negative (or positive) state is set to 0, the position at which the polarity changes from the negative (or positive) state to the positive (or negative) state is set to π, and the position at which the polarity changes from the positive (or negative) state to the negative (or positive) state again is set to 2π.

One horizontal period is subdivided into two horizontal periods with respect to timing at which the potential of the common signal changes. In one of the two subdivided horizontal periods, the potential of the image signal is written to the pixel electrode in the transmissive region. In the other subdivided horizontal period, the potential of the image signal is written to the pixel electrode in the reflective region.

Here, of the two subdivided horizontal periods, the one before the potential of the common signal changes is referred to as an earlier horizontal period (may be referred to as a first sub-horizontal period for driving the pixel electrode in the transmissive region), and the other after the potential of the common signal changes is referred to as a later horizontal period (may be referred to as a second sub-horizontal period for driving the pixel electrode in the reflective region). The scanning signal used to apply the common signal in the early and later horizontal periods has two potentials of $V_{gon}$ and $V_{goff}$, so that during a period in which the potential is at $V_{gon}$, the switching element in the unit pixel is held in the ON-state so that the potential of the image signal may be written to the pixel electrode. The $V_{gon}$ period is referred to as a period for selection. Timing at which the scanning signal applied to the above-mentioned two scanning lines changes from $V_{gon}$ to $V_{goff}$ that is, an ending of the selection period is set in each of the early and later horizontal periods.

Next, a description will be given of operations of the present exemplary embodiment with reference to FIGS. 1-7.

For ease of explanation of the operations of the exemplary embodiment, a description will be given of the operations of a liquid crystal panel 201 shown in FIG. 4 in which the four unit pixels $PE_{ij}$ ($PE_{11}$, $PE_{12}$, $PE_{21}$, $PE_{22}$), one of which is shown in FIG. 2, are arranged in a form of a matrix array with two rows and two columns.

In the liquid crystal panel 201, the common electrodes $COM_{11}$ and $COM_{21}$ in the unit pixels $PE_{11}$ and $PE_{21}$ aligned in the first column respectively are formed independently of the common electrodes $COM_{12}$ and $COM_{22}$ in the unit pixels $PE_{12}$ and $PE_{22}$ aligned in the second column. Further, the paired common electrodes $COM_{11}$ and $COM_{21}$, and the paired common electrodes $COM_{12}$ and $COM_{22}$ are respectively combined and shared in use by two unit pixels adjacent to each other in a column direction.

FIG. 5 shows an equivalent circuit for explaining the interconnections and driving method of the liquid crystal panel 201 having a matrix array with two rows and two columns shown in FIG. 4. Here, the data line set for the n-th column (n=1, 2) is also denoted as $D_n$, ($D_1$, $D_2$) and the scanning lines for the reflective regions and the transmissive regions aligned in the m-th row (m=1, 2) are also denoted as $GR_m$ and $GT_m$ ($GR_1$, $GT_1$; $GR_2$, $GT_2$) respectively. Hereinafter, the common electrodes $COM_{11}$ and $COM_{21}$ in combination may be referred to as common electrode COMA and the common electrodes $COM_{12}$ and $COM_{22}$ in combination may be referred to as a common electrode COMB. "$PT_{mn}$" denotes the transmissive pixel electrode, and "$PR_{mn}$" denotes the transmissive pixel electrode, respectively at an intersection of the m-th row and the n-th column. "COMSA" denotes a common signal which is supplied to the common electrodes COMA, and "COMSB" denotes a common signal which is supplied to the common electrodes COMB. Also, "$DS_1$" denotes the image signal which is supplied to the data lines $D_1$, and "$DS_2$" denotes the image signal which is supplied to the data lines $D_2$.

FIG. 6 shows signals applied to interconnections and electrodes in a case where white display is provided and FIG. 7 shows a change in potential of an electrical potential $PTP_{mn}$ of the transmissive pixel electrode $PT_{mn}$.

The common signals COMSA and COMSB and the image signals $DS_1$ and $DS_2$ are an AC signal whose potential changes in one horizontal period. The common signals COMSA and COMSB are mutually inverted, so that if the common signal COMSA is at 0 V, the common signal COMSB is at 5 V, assuming the HIGH and LOW levels to be 5 V and 0 V respectively. On the other hand, the image signals $DS_1$ and $DS_2$ are opposite of each other in polarity with respect to a reference potential. The common signal COMSA is set so that its phase may shift from that of the image signal $DS_1$ by π/2 and the common signal COMSB is set so that its phase may shift from that of the image signal $DS_2$ by π/2

First, a description will be given of the operations in a case where the unit pixel $PE_{11}$ at an intersection between the first row and the first column is supplied with the scanning signals $GRS_1$ and $GTS_1$, the image signal $DS_1$, and the common signal COMSA with reference to FIGS. 6 and 7.

If a selection period for the scanning signal $GRS_1$ ends, that is, its potential changes from $V_{gon}$ to $V_{goff}$ an electrical potential of 0 V is written to the reflective pixel electrode $PR_{11}$ because the image signal $DS_1$ is at an electrical potential of 0 V. At this point in time, the common signal COMSA is at an electrical potential of 0 V as may be clear from the above, so that there occurs no potential difference between the common electrode COMA and the reflective pixel electrode $PR_{11}$, resulting in white display on the reflective region $RE_{11}$.

On the other hand, if a selection period for the scanning signal $GTS_1$ ends, an electrical potential of 0 V is written to the transmissive pixel electrode $PT_{11}$ because the image signal $DS_1$ is at an electrical potential of 0V. At this point in time, the common signal COMSA is at an electrical potential of 5 V as may be clear from the above. Therefore, an electrical potential difference that corresponds to white display occurs between the common electrode COMA and the transmissive pixel electrode $PT_{11}$, resulting in white display on the transmissive region $TE_{11}$. Further, as shown in FIG. 7, the polarity is negative (−) because potential $PTP_{11}$ of the transmissive pixel electrode $PT_{11}$ is lower than the potential of the common electrode COMA.

Next, a description will be given of the operations in a case where the unit pixel $PE_{12}$ at an intersection between the first row and the second column is supplied with the scanning signals $GRS_1$ and $GTS_1$, the image signal $DS_2$, and the common signal COMSB with reference to FIGS. 6 and 7.

If a selection period for the scanning signal $GRS_1$ ends, an electrical potential of 5 V is written to the reflective pixel electrode $PR_{12}$ because the image signal $DS_2$ is at an electrical potential of 5 V. At this point in time, the common signal COMSB is at an electrical potential of 5V, so that there occurs no potential difference between the common electrode COMB and the reflective pixel electrode $PR_{12}$, resulting in white display on the reflective region $RE_{12}$.

On the other hand, if a selection period for the scanning signal $GTS_1$ ends, an electrical potential of 5 V is written to the transmissive pixel electrode $PT_{12}$ because the image signal $DS_2$ is at an electrical potential of 5V. At this point in time, the common signal COMSB is at an electrical potential of 5 V as may be clear from the above. Therefore, an electrical potential difference that corresponds to white display occurs between the common electrode COMB and the transmissive pixel electrode $PT_{12}$, resulting in white display on the transmissive region $TE_{12}$. Further, as shown in FIG. 7, the polarity is positive (+) because the potential $PTP_{12}$ of the transmissive pixel electrode $PT_{12}$ is higher than the electrical potential of the common electrode COMB.

Next, a description will be given of the operations in a case where the unit pixel $PE_{21}$ at an intersection between the second row and the first column is supplied with the scanning signals $GRS_2$ and $GTS_2$, the image signal $DS_1$, and the common signal COMSA with reference to FIGS. 6 and 7.

If a selection period for the scanning signal $GRS_2$ ends, an electrical potential of 5 V is written to the reflective pixel electrode $PR_{21}$ because the image signal $DS_1$ is at an electrical potential of 5 V. At this point in time, the common signal COMSA is at an electrical potential of 5 V as may be clear from the above, so that there occurs no potential difference between the common electrode COMA and the reflective pixel electrode $PR_{21}$, resulting in white display on the reflective region $RE_{21}$.

On the other hand, if a selection period for the scanning signal $GTS_2$ ends, an electrical potential of 5 V is written to the transmissive pixel electrode $PT_2$, because the image signal $DS_1$ is at an electrical potential of 5 V. At this point in time, the common signal COMSA is at an electrical potential of 0 V as may be clear from the above. Therefore, an electrical potential difference that corresponds to white display occurs between the common electrode COMA and the transmissive pixel electrode $PT_{21}$, resulting in white display on the reflective region $RE_{21}$. Further, as shown in FIG. 7, the polarity is positive (+) because the electrical potential $PTP_{21}$ of the transmissive pixel electrode $PT_{21}$ is higher than the electrical potential of the common electrode COMA.

Next, a description will be given of the operations in a case where the unit pixel $PE_{22}$ at an intersection between the second row and the second column is supplied with the scanning signals $GRS_2$ and $GTS_2$, the image signal $DS_2$, and the common signal COMSB with reference to FIGS. 6 and 7.

If a selection period for the scanning signal $GRS_2$ ends, an electrical potential of 0 V is written to the reflective pixel electrode $PR_{22}$ because the image signal $DS_2$ is at an electrical potential of 0 V. At this point in time, the common signal COMSB is also at an electrical potential of 0 V, so that there occurs no potential difference between the common electrode COMB and the reflective pixel electrode $PR_{22}$, resulting in white display on the reflective region $RE_{22}$.

On the other hand, if a selection period for the scanning signal $GTS_2$ ends, an electrical potential of 0 V is written to the transmissive pixel electrode $PT_{22}$ because the image signal $DS_2$ is at an electrical potential of 0 V. At this point in time, the common signal COMSB is at an electrical potential of 5 V as may be clear from the above. Therefore, an electrical potential difference that corresponds to white display occurs between the common electrode COMB and the transmissive pixel electrode $PT_{22}$, resulting in white display on the reflective region $RE_{22}$. Further, as shown in FIG. 7, the polarity is negative (−) because the electrical potential $PTP_{22}$ of the transmissive pixel electrode $PT_{22}$ is lower than the electrical potential of the common electrode COMB.

As described above, the present exemplary embodiment will provide white display on the transmissive region and the reflective region of each of all the unit pixels in the liquid crystal panel 201, thereby enabling normal display without light-dark reversal.

Further, paying attention to the transmissive region, the unit pixel at an intersection between the first row and the first column is negative in polarity, the unit pixel at an intersection between the first row and the second column is positive in polarity, the unit pixel at an intersection between the second row and the first column is positive in polarity, and the unit pixel at an intersection between the second row and the second column is negative in polarity, thereby enabling dot reversal driving.

Figure 17:
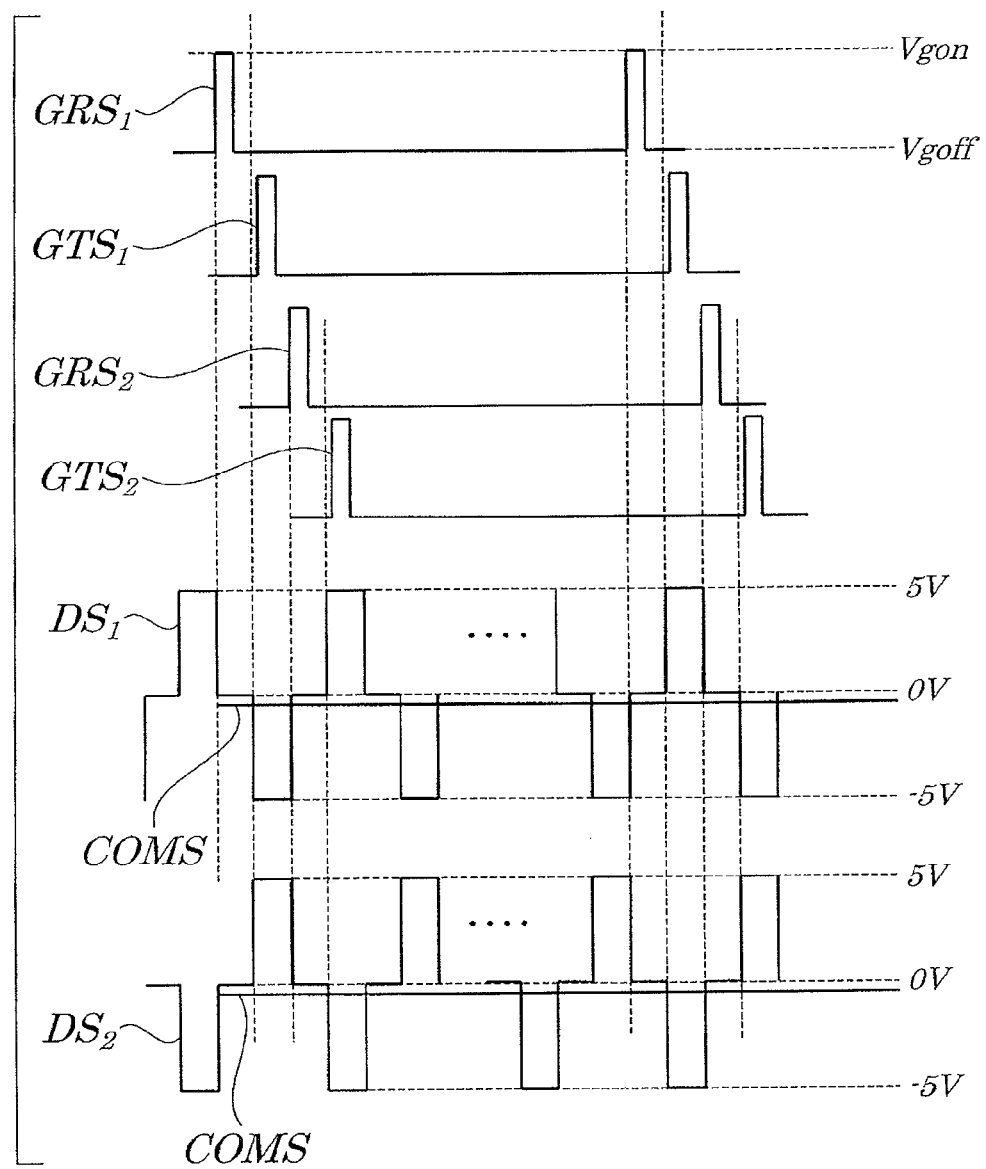
FIG. 17 is a chart for showing one example of waveforms of signals applied to electrodes and interconnections in a case where white display is provided on a conventional semi-transmissive LCD of the third exemplary embodiment.

If the conventional technology is used which implements dot reversal driving with the fixed potential of the common electrode, the amplitude of the image signal will be doubled. That is, as shown in FIG. 17, assuming that the common electrode is at an electrical potential of 0 V and an electrical potential difference that corresponds to white display is 5V between the common electrode and the pixel electrode, the image signals ($DS_1$ and $DS_2$) each need to have an electrical potential from +5V to −5V, that is an amplitude of 5 V, resulting in the necessity of an increase in amplitude. In contrast, in the present exemplary embodiment, the image signals need not have a larger amplitude, so that dot reversal driving can be realized while inhibiting an increase in dissipation power, thereby improving the display quality.

Black display can be provided by reversing the polarity of each of $DS_1$ and $DS_2$ at the time of white display, and halftone display can be provided by setting the electrical potentials of $DS_1$ and $DS_2$ to an arbitrary value somewhere between 0 V and 5 V. Although not described in detail, those display modes also need not increase the amplitude of the image signals and so can realize dot reversal driving while inhibiting an increase in dissipation power.

The above explanation about the operations and effects has been given with reference to a case where the unit pixels are arranged in a form of a matrix array with two rows and two columns in the liquid crystal panel 201.

The explanation about the liquid crystal panel in which the unit pixels are arranged in a form of a matrix array with two rows and two columns can be expanded and applied also to a liquid crystal panel in which the unit pixels are arranged in a form of a matrix array with "m" rows and "n" columns, where "m" and "n" are an integer of three or larger.

As described above, by the configurations in the present exemplary embodiment, in a lateral field mode semi-transmissive LCD by use of the liquid crystal panel in which the unit pixels are arranged in a form of a matrix array with "m" rows and "n" columns, dot reversal driving can be realized with no increase in amplitude of the image signals while inhibiting an increase in dissipation power, thereby improving the display quality.

Further, by forming the common electrodes and the reflective pixel electrodes from a low-reflectivity conductor or a multilayer-structured film made of a conductor and its oxide, light leakage at the time of black display can be inhibited in the reflection mode, thereby further improving the display quality.

Second Exemplary Embodiment

Figure 8:
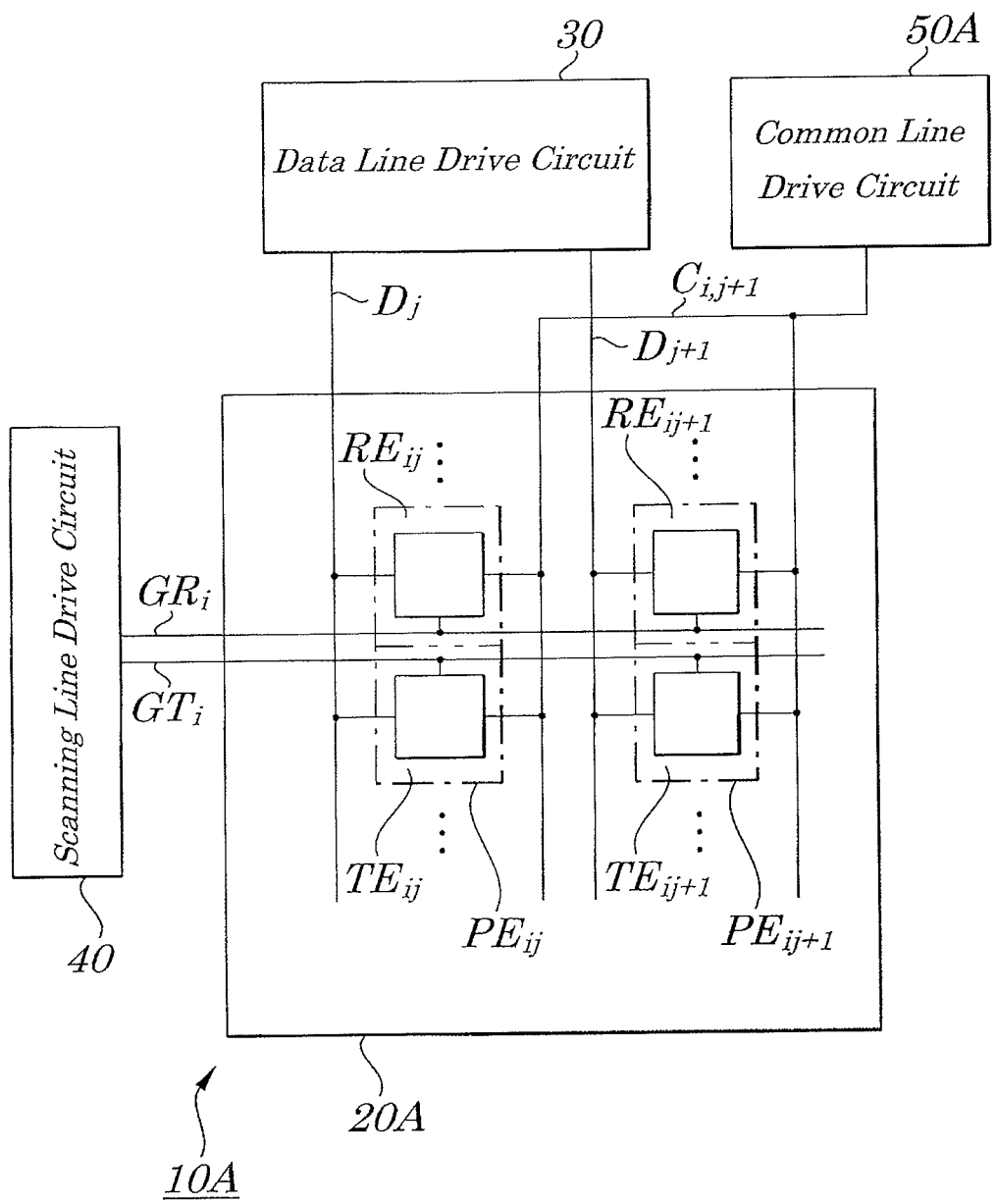
FIG. 8 is a block diagram for showing electrical configurations of a lateral field mode semi-transmissive LCD according to a second exemplary embodiment of the present invention.
Figure 9:
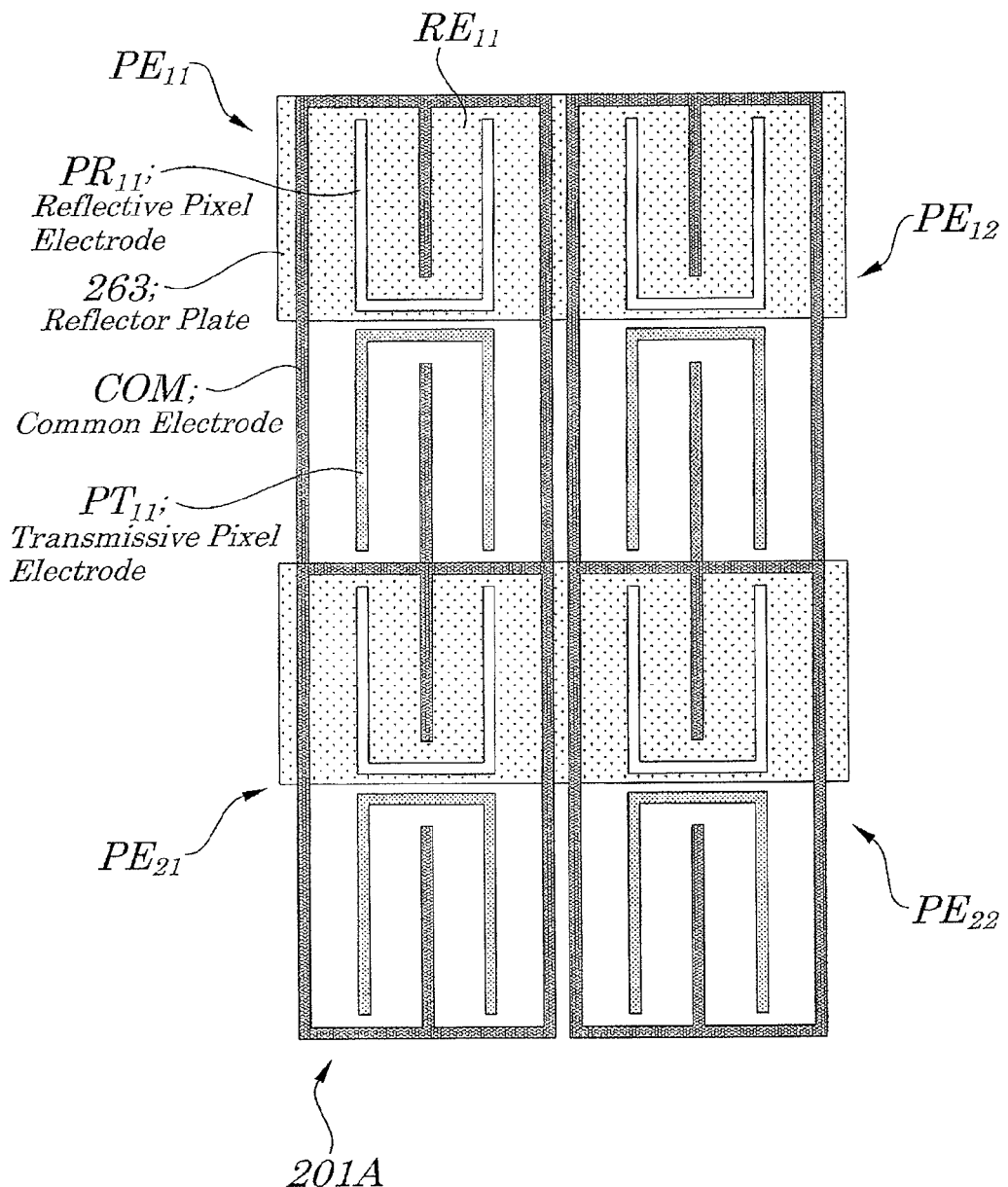
FIG. 9 is a plan view for showing unit pixels of the lateral field mode semi-transmissive LCD in a form of a matrix array with two rows and two columns.
Figure 10:
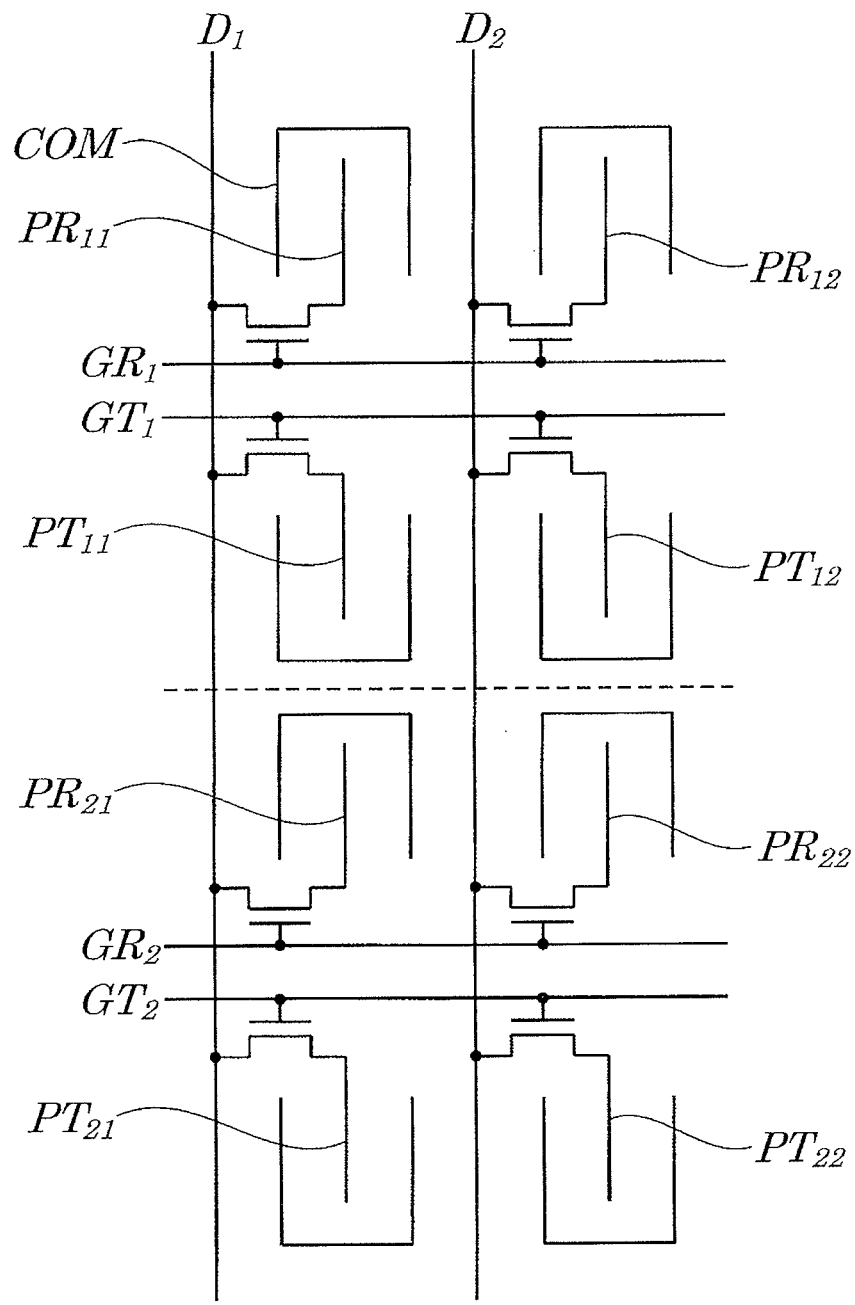
FIG. 10 is a diagram for showing an equivalent circuit of the unit pixel in a form of a matrix array with two rows and two columns shown in FIG. 9.
Figure 11:
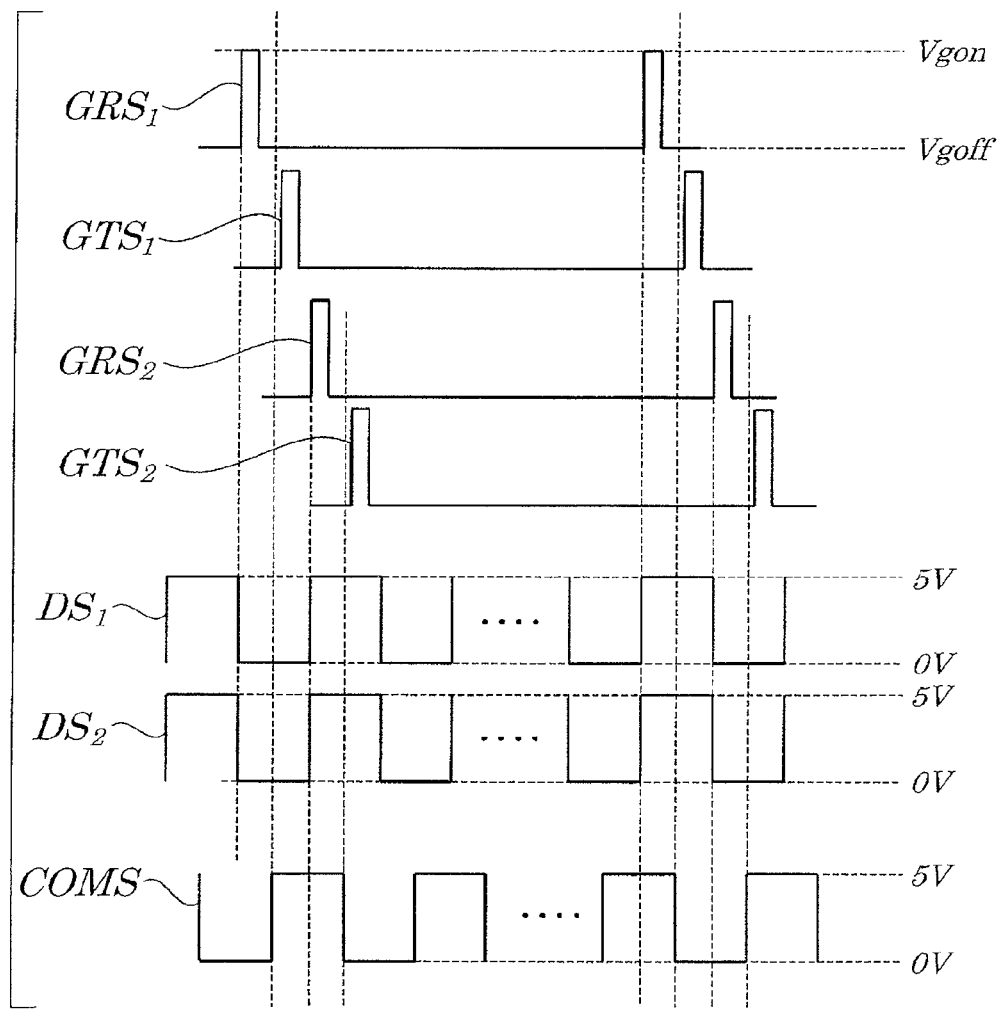
FIG. 11 is a waveform chart of signals applied to electrodes and interconnections in a case where white display is provided on the semi-transmissive LCD of the second exemplary embodiment.

FIG. 8 is a block diagram for showing electrical configurations of a lateral field mode semi-transmissive liquid crystal display device (LCD) according to the second exemplary embodiment of the present invention, FIG. 9 is a plan view of a liquid crystal panel in the lateral field mode semi-transmissive LCD in which unit pixels are arranged in a form of a matrix array with two rows and two columns, FIG. 10 is a diagram for showing an equivalent circuit of the liquid crystal panel shown in FIG. 9, and FIG. 11 is a waveform chart of signals applied to electrodes and interconnections in a case where white display is provided on the lateral field mode semi-transmissive LCD.

The configurations of the present exemplary embodiment are different from those of the first exemplary embodiment in that common electrodes used for the unit pixels aligned in the odd-numbered column and common electrodes aligned in the even-numbered column are electrically combined with each other.

A lateral field mode semi-transmissive LCD 10A in the present exemplary embodiment is the same as the LCD in the first exemplary embodiment in that, as shown in FIG. 8, a data line $D_j$ ("j" is any one of 1, 2, . . . , and "n") connected to unit pixels $PE_{ij}$ ("i"=1, 2, . . . , and "m") arranged in a form of a matrix array with "m" rows and "n" columns within a liquid crystal panel 20A is connected to a data line drive circuit 30, and that scanning lines $GR_i$ and $GT_i$ are connected to a scanning line drive circuit 40.

Such a configuration is employed that the common lines $COM_{ij+1}$ connected to the unit pixels $PE_{ij}$ and $PE_{ij+1}$ may be commonly connected to the common electrodes aligned in the even-numbered and odd-numbered columns of the "n" pieces of columns. That is, these common electrodes all are integrated into a single common electrode. More specifically explaining with reference to FIG. 9, in a liquid crystal panel 201A shown in FIG. 9 in which four unit pixels are arranged in a form of a matrix array with two rows and two columns, the same common electrode COM is configured in such a manner to be common to all of four unit pixels.

Such changes are accompanied by the following differences. A common signal applied to the common electrode COM is an AC signal whose potential, which has two potentials of HIGH and LOW levels, changes in a period which corresponds to one horizontal period in which a signal from the data line are written to the pixel electrodes aligned in each display line. Further, an image signal applied to the data line is also an AC signal whose potential, which is set somewhere between the HIGH and LOW levels of the common signal, changes in a period which corresponds to the one horizontal period.

Further, the image signals for all the columns are set so that they may have the same polarity with respect to a reference voltage. The common signal has a different phase from the image signal, a phase difference between which signals is set smaller than $\pi$. Typically, the phase difference is set to $\pi/2$.

Other than the above configuration, the present exemplary embodiment has the same configurations as the first exemplary embodiment and repetitive explanation of each of them will be omitted.

Next, a description will be given of operations of the present exemplary embodiment with reference to FIGS. 8-11.

Also about the present exemplary embodiment, for ease of explanation, a description will be given of operations of the liquid crystal panel 201A shown in FIG. 9 in which the four unit pixels $PE_{ij}$, one of which is shown in FIG. 2, are arranged in a form of a matrix array with two rows and two columns.

In the liquid crystal panel 201A, the common electrode formed in the unit pixels $PE_{11}$ and $PE_{21}$ aligned in the first column and the common electrode formed in the unit pixels $PE_{21}$ and $PE_{22}$ aligned in the second column are electrically integrated into a single common electrode COM.

FIG. 10 is an equivalent circuit for describing the interconnections and driving method of the liquid crystal panel 201A in a form of a matrix array with two rows and two columns as shown in FIG. 9. Here, "$D_n$" denotes the data line set for the n-th column (n=1, 2). Also, "$GR_m$" denotes the scanning lines for the reflective regions, and "$GT_m$" denotes the transmissive regions, respectively aligned in the m-th row (m=1, 2). "$PT_{mn}$" denotes the transmissive pixel electrode, and "$PR_{mn}$" denotes the transmissive pixel electrode, respectively at an intersection of the m-th row and the n-th column.

FIG. 11 shows signals applied to the interconnections and electrodes in a case where white display is provided. In this figure, the common signal COMS and the image signals $DS_1$ and $DS_2$ are an AC signal whose potential changes in one horizontal period. Further, the image signals $DS_1$ and $DS_2$ are arranged to have the same polarity with respect to the reference voltage. Further, the common signal COMS is set so that its phase may shift from those of the image signals $DS_1$ and $DS_2$ by $\pi/2$.

First, a description will be given of the operations in a case where the unit pixels $PE_{11}$, and $PE_{12}$ aligned in the first row are supplied with the scanning signals $GRS_1$ and $GTS_1$, the image signals $DS_1$ and $DS_2$, and the common signal COMS with reference to FIG. 11.

If a selection period for the scanning signal $GRS_1$ ends, that is, its potential changes from $V_{gon}$ to $V_{goff}$, an electrical potential of 0 V is written to the reflective pixel electrodes $PR_{11}$ and $PR_{12}$ because the image signals $DS_1$ and $DS_2$ are at an electrical potential of 0 V. At this point in time, the common signal COMS is also at an electrical potential of 0 V, so that there occurs no potential difference between the common electrode COM and the reflective pixel electrode $PR_{11}$, resulting in white display on reflective region $RE_{11}$.

On the other hand, if a selection period for the scanning signal $GTS_1$ ends, an electrical potential of 0 V is written to the transmissive pixel electrodes $PT_{11}$ and $PT_{12}$ because the image signals $DS_1$ and $DS_2$ are at an electrical potential of 0 V. At this point in time, the common signal COMS is at an electrical potential of 5 V as may be clear from the above. Therefore, an electrical potential difference that corresponds to white display occurs between the common electrode COM and the transmissive pixel electrodes $PT_{11}$ and $PT_{12}$, resulting in white display on transmissive region $TE_{11}$.

Next, a description will be given of the operations in a case where the unit pixels $PE_{21}$ and $PE_{22}$ aligned in the second row are supplied with the scanning signals $GRS_2$ and $GTS_2$, the image signals $DS_1$ and $DS_2$, and the common signal COMS with reference to FIG. 11.

If a selection period for the scanning signal $GRS_2$ ends, an electrical potential of 5 V is written to the reflective pixel electrodes $PR_{21}$ and $PR_{22}$ because the image signals $DS_1$ and $DS_2$ are at an electrical potential of 5 V. At this point in time, the common signal COMS is also at an electrical potential of 5 V, so that there occurs no potential difference between the common electrode COM and each of the reflective pixel electrodes $PR_{21}$ and $PR_{22}$, resulting in white display on the reflective regions $RE_{21}$ and $RE_{22}$.

On the other hand, if a selection period for the scanning signal $GTS_2$ ends, an electrical potential of 5 V is written to the transmissive pixel electrodes $PT_{21}$ and $PT_{22}$ because the image signals $DS_1$ and $DS_2$ are at an electrical potential of 5 V. At this point in time, the common signal COMS is at an electrical potential of 0 V as may be clear from the above. Therefore, an electrical potential difference that corresponds to white display occurs between the common electrode COM and each of the transmissive pixel electrodes $PT_{21}$ and $PT_{22}$, resulting in white display on the transmissive regions $TE_{21}$ and $TE_{22}$.

As described above, the present exemplary embodiment will provide white display on the transmissive region and the reflective region of each of all the unit pixels in the liquid crystal panel 201A, thereby enabling normal display without light-dark reversal.

Figure 18:
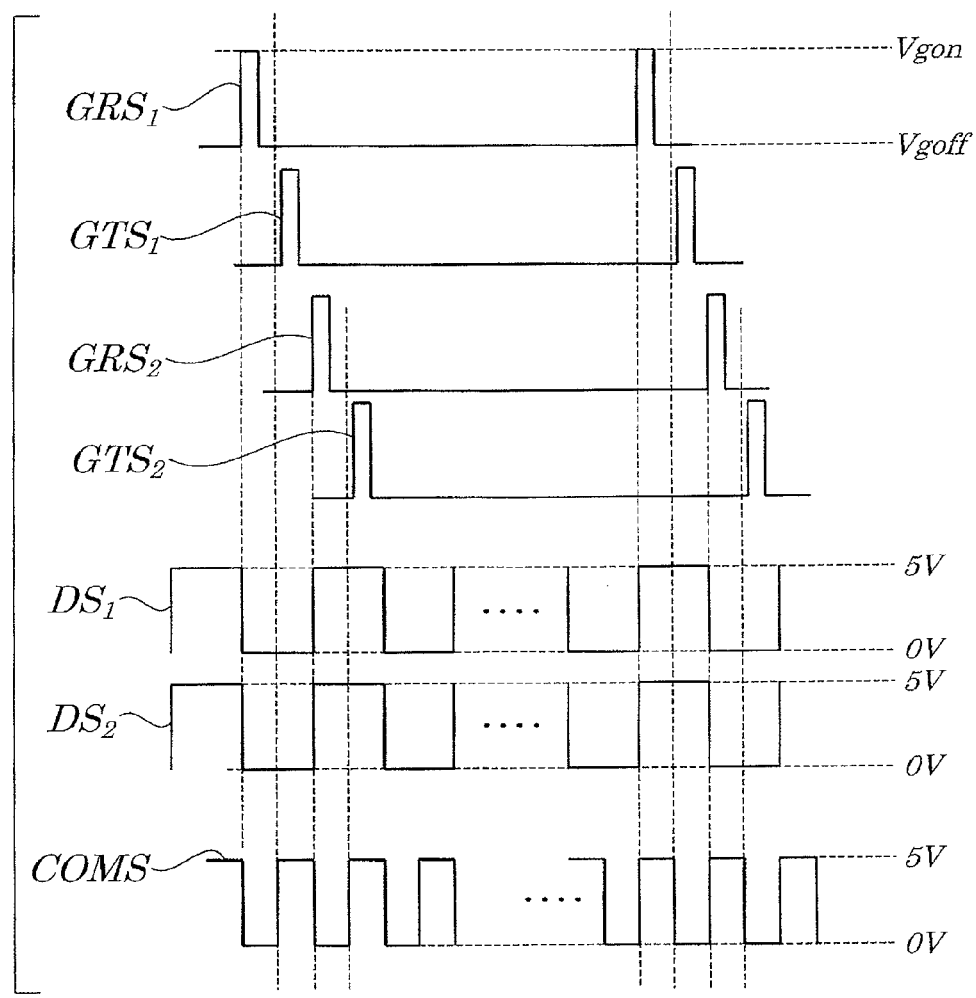
FIG. 18 is a chart for showing another example of the waveforms of the signals applied to the electrodes and the interconnections in the case where white display is provided on the conventional semi-transmissive LCD of the third exemplary embodiment.

Further, in contrast to the conventional technology in which as shown in FIG. 18, the common electrodes are integrated into a single common electrode by doubling the drive frequency of the common signal in such a manner that an electrical potential difference between the image signal and the common signal may be different between the reflective region and the transmissive region, in the present exemplary embodiment there is no need to increase the drive frequency. Therefore, it is possible to integrate the common electrodes required into one without an increase in dissipation power due to an increase in drive frequency, thereby improving the numerical aperture for better display qualities.

The above explanation about the operations and effects has been given with reference to a case where the liquid crystal panel 201A has a form of a matrix array with two rows and two columns.

The explanation about the liquid crystal panel in which the unit pixels are arranged in a form of a matrix array with two rows and two columns can be expanded and applied also to a liquid crystal panel in which the unit pixels are arranged in a form of a matrix array with "m" rows and "n" columns, where m and n are an integer of three or larger.

As described above, by the configurations in the present exemplary embodiment, in a lateral field mode semi-transmissive LCD by use of the liquid crystal panel in which the unit pixels are arranged in a form of a matrix array with "m" rows and "n" columns, count of the common electrodes required can be reduced to one while inhibiting an increase in dissipation power due to an increase in the drive frequency of the common electrode, thereby improving the display qualities.

Third Exemplary Embodiment

According to a third exemplary embodiment of the present invention, there is provided a semi-transmissive liquid crystal display device including: a plurality of unit pixels arranged in a form of a matrix array, the unit pixels each including a transmissive region and a reflective region; a plurality of first scanning lines each connected to a first switching element formed in the transmissive region making up the unit pixel aligned in an odd-numbered column, and to a first switching element formed in the reflective region making up the unit pixel aligned in an even-numbered column; and a plurality of second scanning lines each connected to a second switching element formed in the transmissive region making up the unit pixel aligned in the even-numbered column, and to a second switching element formed in the reflective region making up the unit pixel aligned in the odd-numbered column, wherein the plurality of the first scanning lines, the plurality of the second scanning lines, a transmissive pixel electrode for the transmissive region, a reflective pixel electrode for the reflective region, and a common electrode are formed on the same first substrate.

Figure 12:
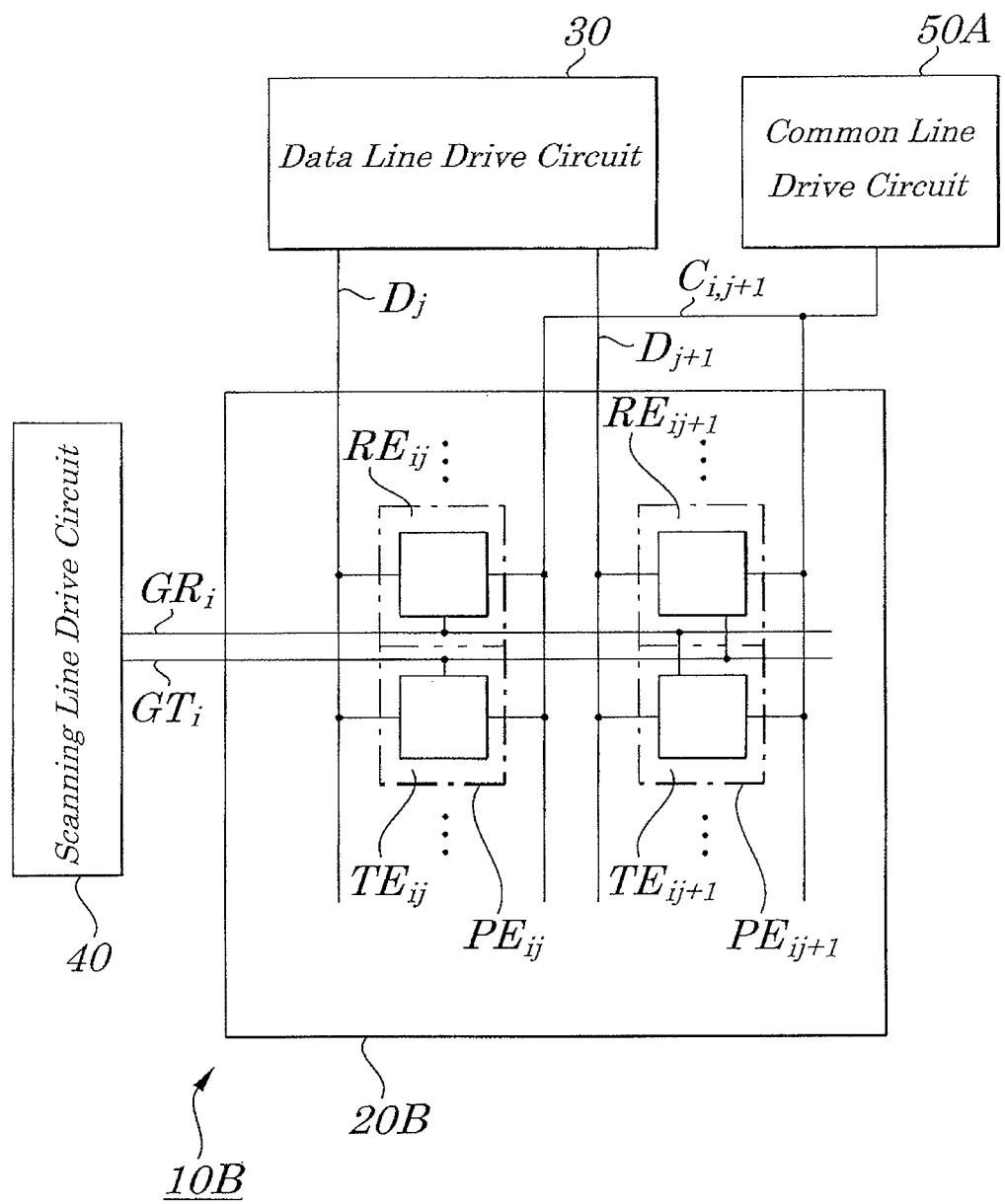
FIG. 12 is a block diagram for showing electrical configurations of a lateral field mode semi-transmissive LCD according to a third exemplary embodiment of the present invention.
Figure 13:
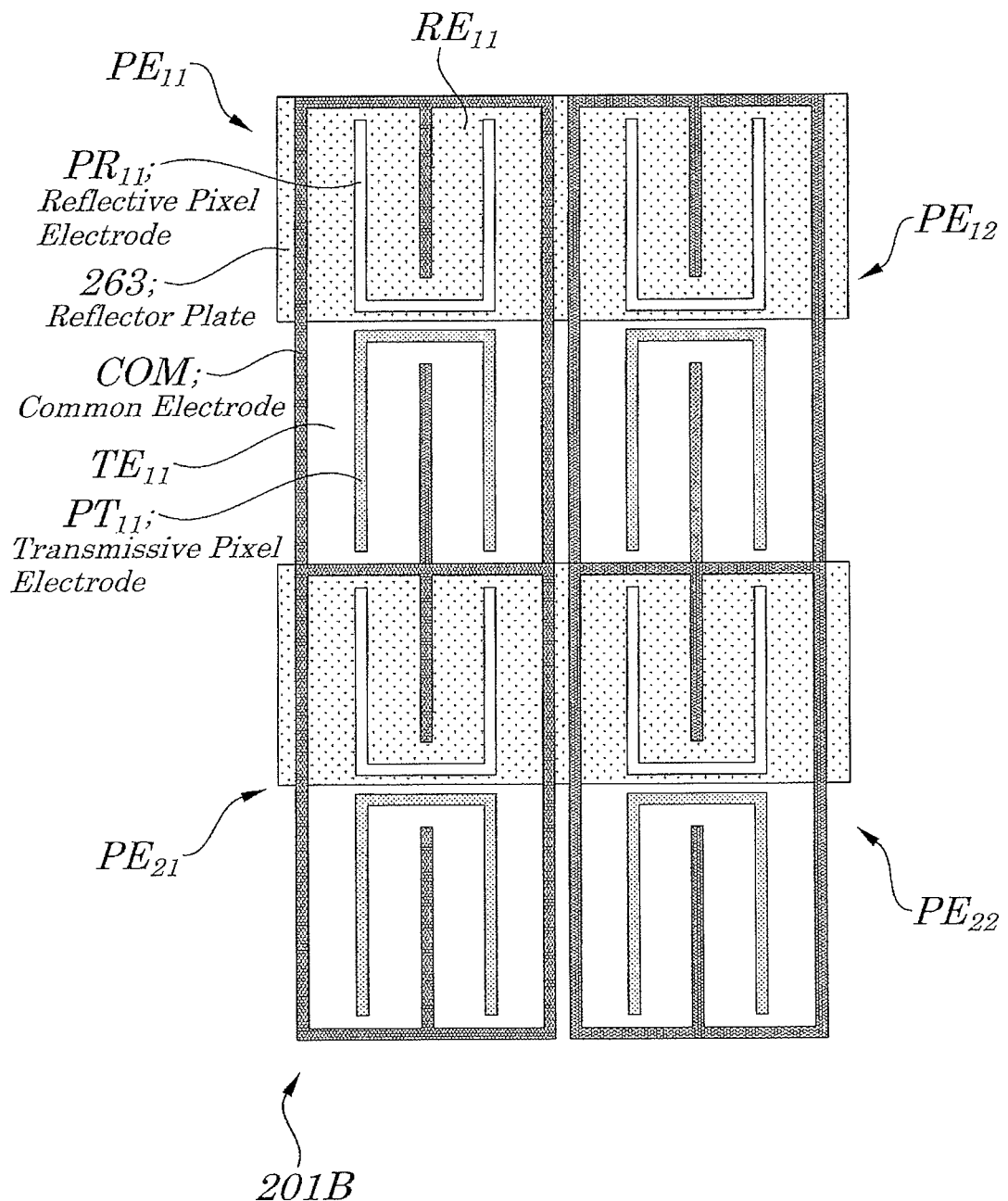
FIG. 13 is a plan view for showing unit pixels of the lateral field mode semi-transmissive LCD in a form of a matrix array with two rows and two columns.
Figure 14:
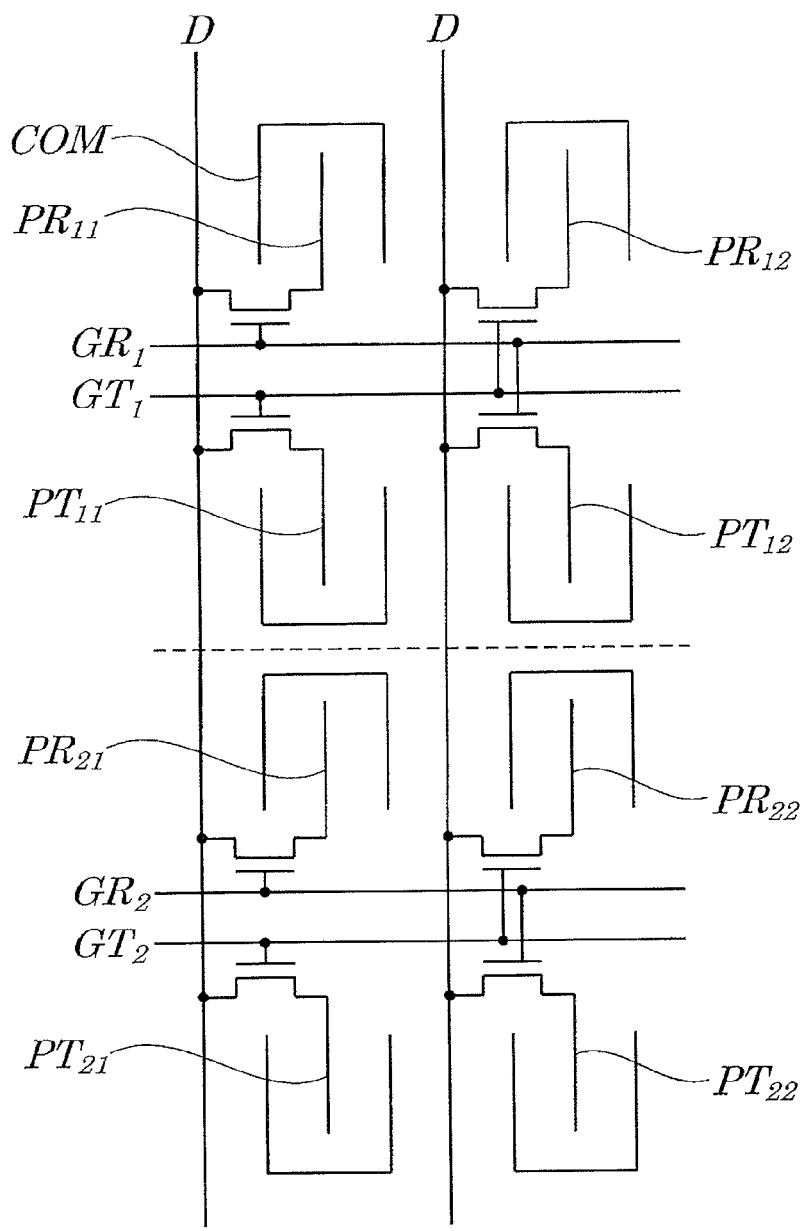
FIG. 14 is a circuit diagram for showing an equivalent circuit of the unit pixels in a form of a matrix array with two rows and two columns shown in FIG. 13.
Figure 15:
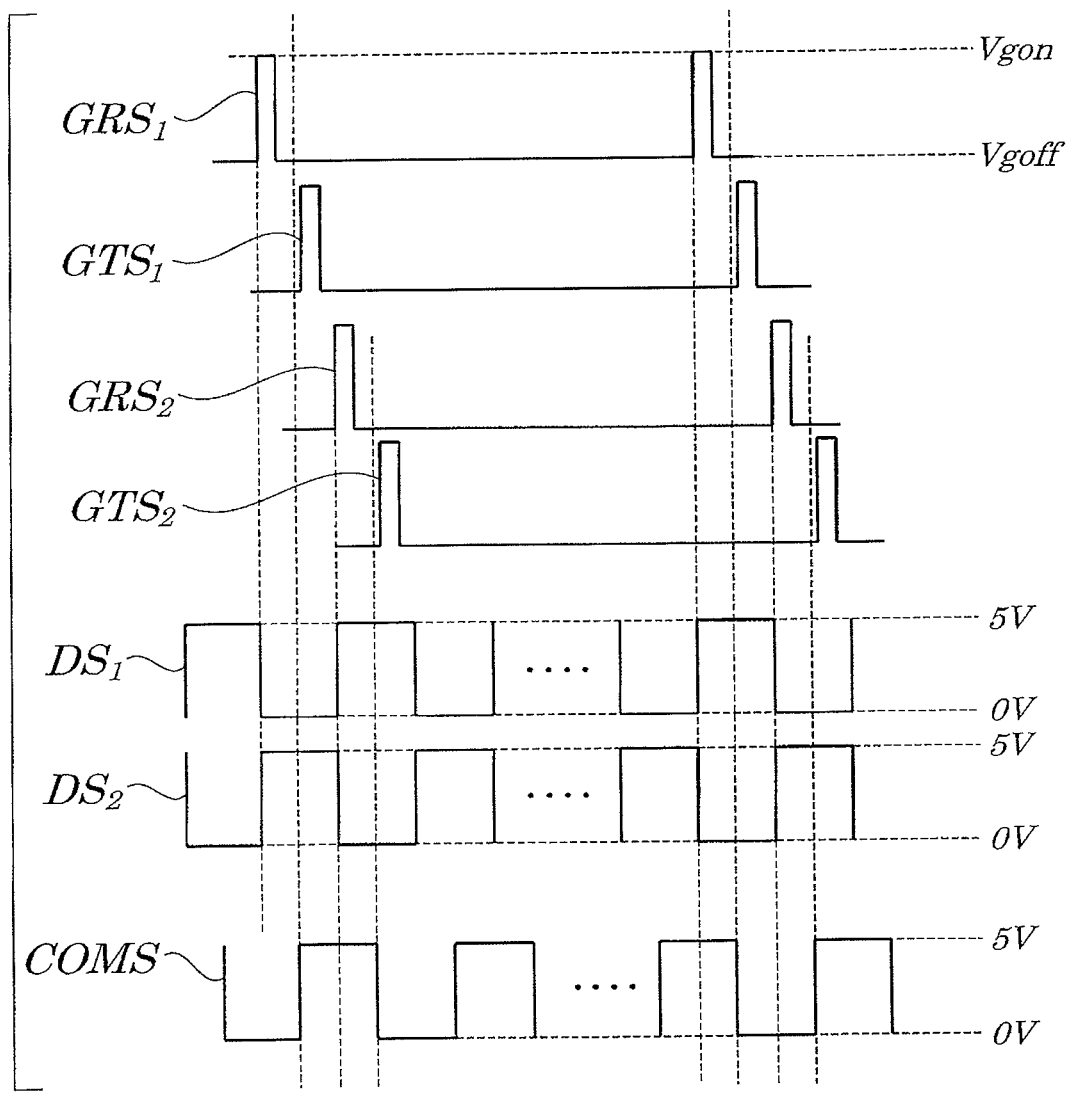
FIG. 15 is a waveform chart of signals applied to electrodes and interconnections in a case where white display is provided on the semi-transmissive LCD of the third exemplary embodiment.
Figure 16:
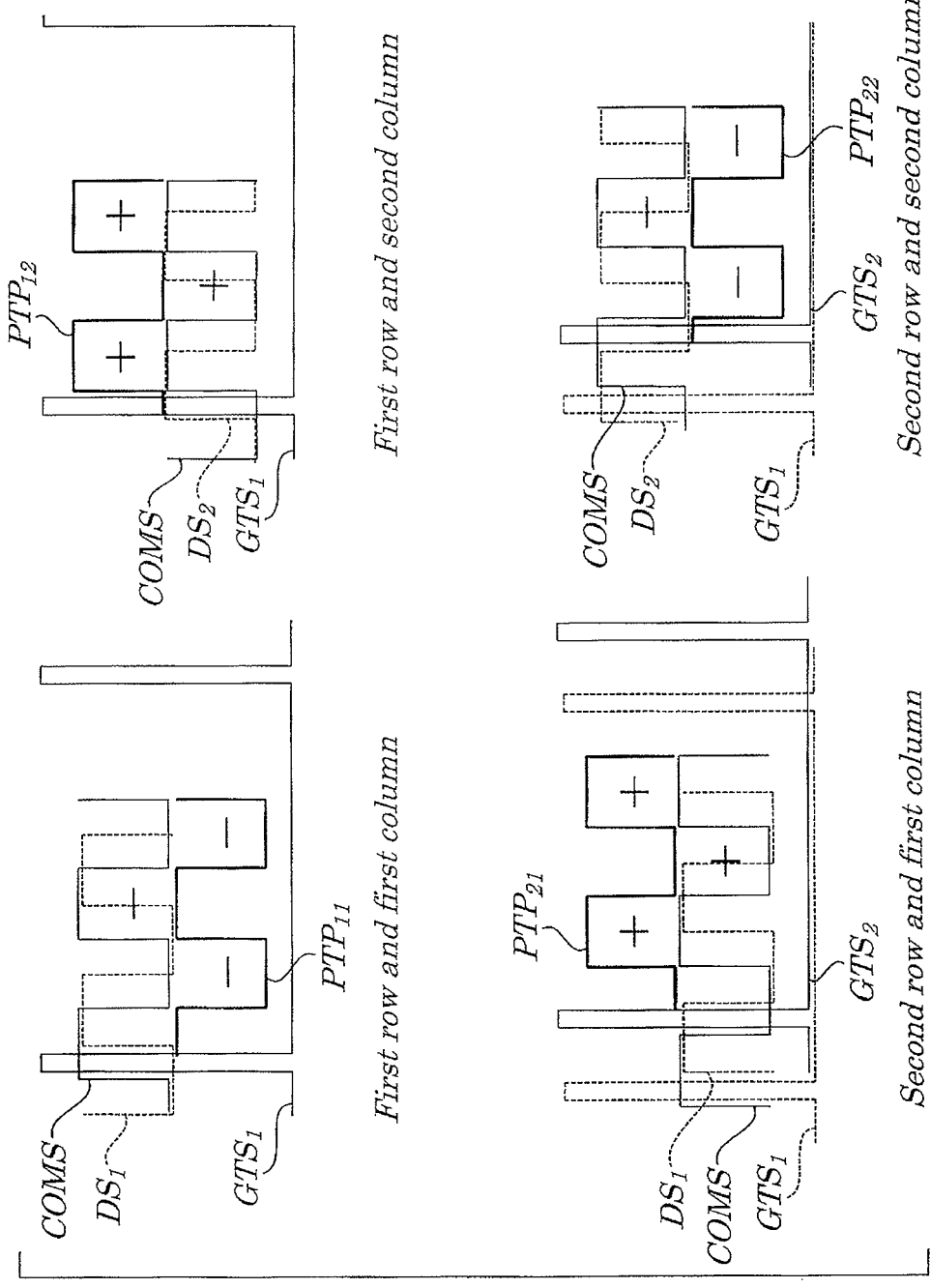
FIG. 16 is a chart for showing a change in potential of transmissive pixel electrodes in the case where white display is provided on the semi-transmissive LCD of the third exemplary embodiment.

FIG. 12 is a block diagram for showing electrical configurations of a lateral field mode semi-transmissive liquid crystal display device (LCD) according to the third exemplary embodiment of the present invention, FIG. 13 is a plan view of a liquid crystal panel of the lateral field mode semi-transmissive LCD in a form of a matrix array with two rows and two columns, FIG. 14 is a diagram for showing an equivalent circuit of the liquid crystal panel shown in FIG. 13, FIG. 15 is a waveform chart of signals applied to electrodes and interconnections in a case where white display is provided on the lateral field mode semi-transmissive LCD, and FIG. 16 is a chart for showing a change in potential of transmissive pixel electrodes in the case where white display is provided on the lateral field mode semi-transmissive LCD.

The configurations of the present exemplary embodiment are different from those of the second exemplary embodiment in that on each row, the relationship of connection between a scanning line for a reflective region aligned in an odd-numbered column and that for a transmissive region aligned in the same column is replaced with the relationship of connection between the scanning line for the reflective region aligned in the even-numbered column and that for the transmissive region aligned in the same column.

A lateral field mode semi-transmissive LCD 10B in the present exemplary embodiment is the same as the LCD in the first exemplary embodiment in that, as shown in FIG. 13, a data line $D_j$ connected to a matrix of unit pixels $PE_{ij}$ ("i" is any one of 1, 2, . . . , and "m", and "j" is any one of 1, 2, . . . , and "n") arranged in a form of a matrix array with "m" rows and "n" columns is connected to a data line drive circuit 30 and that scanning lines $GR_i$ and $GT_i$ are connected to a scanning line drive circuit 40.

Such a configuration is employed that common lines $COM_{ij+l}$ connected to the unit pixels $PE_{ij}$ and $PE_{ij+l}$ may be commonly connected to common electrodes aligned in the odd-numbered column and even-numbered one of the "n" pieces of columns. That is, these common electrodes all are integrated into a single common electrode. More specifically describing the configuration with reference to FIG. 13, in a liquid crystal panel 201B shown in FIG. 13 in which four unit pixels are arranged in a form of a matrix array with two rows and two columns, the same common electrode is placed in such a manner to be common to all of four unit pixels.

The difference in configuration from the second exemplary embodiment is that on each row, the relationship of connection between the scanning line for the reflective region aligned in an odd-numbered column and that for the transmissive region aligned in the same odd-numbered column is replaced with the relationship of connection between the scanning line for the reflective region aligned in the even-numbered column and that for the transmissive region aligned in the same even-numbered column. More specifically describing this configuration with reference to FIG. 14, the scanning line connection relationship has been changed in such a manner that the scanning lines $GR_1$ and $GT_1$ may be used for the reflective regions and the transmissive regions aligned in the same odd-numbered column respectively, while the scanning lines $GT_1$ and $GR_1$ may be used for the reflective regions and the transmissive regions aligned in the same even-numbered column respectively.

Other than the above configuration, the present exemplary embodiment has the same configurations as the first exemplary embodiment and repetitive explanation of each of them will be omitted.

Next, a description will be given of operations of the present exemplary embodiment with reference to FIGS. 12-16.

Also about the present exemplary embodiment, for ease of explanation, similar to the case of the second exemplary embodiment, a description will be given of operations of the liquid crystal panel 201B shown in FIG. 13 in which the four unit pixels $PE_{ij}$, one of which is shown in FIG. 2, are arranged in a form of a matrix array with two rows and two columns.

In the liquid crystal panel 201B, the common electrode formed in the unit pixels $PE_{11}$ and $PE_{21}$ aligned in the first column and the common electrode formed in the unit pixels $PE_{12}$ and $PE_{22}$ aligned in the second column are electrically integrated into a single common electrode COM.

FIG. 14 is an equivalent circuit diagram for describing the interconnections and driving method of the liquid crystal panel 201B which has a form of a matrix array with two rows and two columns shown in FIG. 13. FIG. 15 shows signals applied to the interconnections and electrodes in a case where white display is provided. In this figure, a common signal COMS and image signals $DS_1$ and $DS_2$ are AC signals whose potential changes in one horizontal period. Further, the image signals $DS_1$ and $DS_2$ are arranged to be opposite of each other in polarity with respect to a reference voltage. Further, the common signal COMS is set so that its phase may shift from that of the image signal $DS_1$ by $\pi/2$.

First, a description will be given of the operations in a case where the unit pixels $PE_{11}$ at an intersection between the first row and the first column is supplied with the scanning signals $GRS_1$ and $GTS_1$, the image signal $DS_1$, and the common signal CONS with reference to FIGS. 15 and 16.

If a selection period for the scanning signal $GRS_1$ ends, that is, its potential changes from $V_{gon}$ to $V_{goff}$, an electrical potential of 0 V is written to the reflective pixel electrode $PR_{11}$ because the image signal $DS_1$ is at an electrical potential of 0 V. At this point in time, the common signal COMS is at an electrical potential of 0 V as may be clear from the above, so that there occurs no potential difference between the common electrode COM and the reflective pixel electrode $PR_{11}$, resulting in white display on the reflective region $RE_{11}$.

On the other hand, if a selection period for the scanning signal $GTS_1$ ends, an electrical potential of 0 V is written to the transmissive pixel electrode $PT_{11}$ because the image signal $DS_1$ is at an electrical potential of 0 V. At this point in time, the common signal COMS is at an electrical potential of 5 V as may be clear from the above. Therefore, an electrical potential difference that corresponds to white display occurs between the common electrode COM and the transmissive pixel electrode $PT_{11}$, resulting in white display on the transmissive region $TE_{11}$. Further, as shown in FIG. 16, the polarity is negative (−) because the electrical potential $PTP_{11}$ of the transmissive pixel electrode $PT_{11}$ is lower than the electrical potential of the common electrode COM.

Next, a description will be given of the operations in a case where the unit pixel $PE_{12}$ at an intersection between the first row and the second column is supplied with the scanning signals $GRS_1$ and $GTS_1$, the image signal $DS_2$, and the common signal CONS with reference to FIGS. 15 and 16.

Since the respective scanning lines for the reflective regions and the transmissive regions aligned in the same odd-numbered column have been replaced with the respective scanning lines for the reflective regions and the transmissive regions aligned in the same even-numbered column, an electrical potential is written to the transmissive pixel electrode $PT_{12}$ by using the scanning signal $GRS_1$ and an electrical potential is written to the reflective pixel electrode $PR_{12}$ by using the scanning signal $GTS_1$.

If a selection period for the scanning signal $GTS_1$ ends, an electrical potential of 5 V is written to the reflective pixel electrode $PR_{12}$ because the image signal $DS_2$ is at an electrical potential of 5 V. At this point in time, the common signal COMS is at an electrical potential of 5 V as may be clear from the above, so that there occurs no potential difference between the common electrode COM and the reflective pixel electrode $PR_{12}$, resulting in white display on the reflective region $RE_{12}$.

On the other hand, if a selection period for the scanning signal $GRS_1$ ends, an electrical potential of 5 V is written to the transmissive pixel electrode $PT_{12}$ because the image signal $DS_2$ is at an electrical potential of 5 V. At this point in time, the common signal COMS is at an electrical potential of 0 V as may be clear from the above. Therefore, an electrical potential difference that corresponds to white display occurs between the common electrode COM and the transmissive pixel electrode $PT_{12}$, resulting in white display on the transmissive region $TE_{12}$. Further, as shown in FIG. 16, the polarity is positive (+) because the electrical potential $PTP_{12}$ of the transmissive pixel electrode $PT_{12}$ is higher than the electrical potential of the common electrode COM.

Next, a description will be given of the operations in a case where the unit pixel $PE_{21}$ at an intersection between the second row and the first column is supplied with the scanning signals $GRS_2$ and $GTS_2$, the image signal $DS_1$, and the common signal COMS with reference to FIGS. 15 and 16.

If a selection period for the scanning signal $GRS_2$ ends, an electrical potential of 5 V is written to the reflective pixel electrode $PR_{21}$ because the image signal $DS_1$ is at an electrical potential of 5 V. At this point in time, the common signal COMS is at an electrical potential of 5 V as may be clear from the above, so that there occurs no potential difference between the common electrode COM and the reflective pixel electrode $PR_{21}$, resulting in white display on the reflective region $RE_{21}$.

On the other hand, if a selection period for the scanning signal $GTS_2$ ends, an electrical potential of 5 V is written to the transmissive pixel electrode $PT_{21}$ because the image signal $DS_1$ is at an electrical potential of 5 V. At this point in time, the common signal COMS is at an electrical potential of 0 V as may be clear from the above. Therefore, an electrical potential difference that corresponds to white display occurs between the common electrode COM and the transmissive pixel electrode $PT_{21}$, resulting in white display on the reflective region $RE_{21}$. Further, as shown in FIG. 16, the polarity is positive (+) because the electrical potential $PTP_{21}$ of the transmissive pixel electrode $PT_{21}$ is higher than the electrical potential of the common electrode COM.

Next, a description will be given of the operations in a case where the unit pixel $PE_{22}$ at an intersection between the second row and the second column is supplied with the scanning signals $GRS_2$ and $GTS_2$, the image signal $DS_2$, and the common signal COMS with reference to FIGS. 15 and 16.

Since the respective scanning lines for the reflective regions and the transmissive regions aligned in the same odd-numbered column have been replaced with the respective scanning lines for the reflective regions and the transmissive regions aligned in the same even-numbered column, an electrical potential is written to the transmissive pixel electrode $PT_{22}$ by using the scanning signal $GRS_2$ and an electrical potential is written to the reflective pixel electrode $PR_{22}$ by using the scanning signal $GTS_2$.

If a selection period for the scanning signal $GTS_2$ ends, an electrical potential of 0 V is written to the reflective pixel electrode $PR_{22}$ because the image signal $DS_2$ is at an electrical potential of 0 V. At this point in time, the common signal COMS is also at an electrical potential of 0 V as may be clear from the above. Therefore, the electrical potential of the common electrode COMS is also 0 V, so that there occurs no potential difference between the common electrode COM and the reflective pixel electrode $PR_{22}$, resulting in white display on the reflective region $RE_{22}$.

On the other hand, if a selection period for the scanning signal $GRS_2$ ends, an electrical potential of 0 V is written to the transmissive pixel electrode $PT_{22}$ because the image signal $DS_2$ is at an electrical potential of 0 V. At this point in time, the common signal COMS is at an electrical potential of 5 V as may be clear from the above. Therefore, an electrical potential difference that corresponds to white display occurs between the common electrode COMB and the transmissive pixel electrode $PT_{22}$, resulting in white display on the transmissive region $TE_{22}$. Further, as shown in FIG. 16, the polarity is negative (−) because the electrical potential $PTP_{22}$ of the transmissive pixel electrode $PT_{22}$ is lower than the electrical potential of the common electrode COM.

In such a manner, white display will be provided on the transmissive region and the reflective region of each of all the unit pixels in the liquid crystal panel 201B, thereby enabling normal display without light-dark reversal.

Further, paying attention to the transmissive region, the unit pixel at an intersection between the first row and the first column is negative in polarity, the unit pixel at an intersection between the first row and the second column is positive in polarity, the unit pixel at an intersection between the second row and the first column is positive in polarity, and the unit pixel at an intersection between the second row and the second column is negative in polarity, thereby enabling dot reversal driving. It is further possible to integrate the common electrodes into one.

Owing to the arrangements, as described with reference to the first and second exemplary embodiments, the present exemplary embodiment will increase the amplitude of the image signals or the drive frequency of the common signal and so will not increase dissipation power. It is, therefore, possible to reduce the dot reversal driving and the common electrodes, thereby improving the display quality.

The above explanation about the operations and effects has been given with reference to a case where the unit pixels are arranged in a form of a matrix array with two rows and two columns.

The explanation about the liquid crystal panel in which the unit pixels are arranged in a form of a matrix array with two rows and two columns can be expanded and applied also to a liquid crystal panel in which the unit pixels are arranged in a form of a matrix array with 2m" rows and "n" columns, where "m" and "n" are an integer of three or larger.

Further, although the present exemplary embodiment has replaced connection of the switching elements to the scanning lines for the transmissive regions with connection of the switching elements to the scanning lines for reflective regions aligned in the same even-numbered column, the connection of the switching elements to the scanning lines for the transmissive regions with the connection of the switching elements to the scanning lines for reflective regions aligned in the same odd-numbered column.

As described above, by the configurations in the present exemplary embodiment, it is possible to employ dot reversal driving as the driving method and integrate the common electrodes required into one while inhibiting an increase in dissipation power due to increases in amplitude of the image signals and drive frequency of the common electrode, thereby increasing the numerical aperture for better display qualities.

While the invention has been particularly shown and described with reference to exemplary embodiments thereof, the invention is not limited to these exemplary embodiments.

For example, the present invention can be applied not only to a lateral field mode semi-transmissive LCD also to a vertical field mode semi-transmissive LCD. Further, besides a semi-transmissive LCD, the present invention can be applied to an LCD in which a unit pixel may have two sub-pixels so that an electrical potential difference between the common electrode and the pixel electrode may be different between those two sub-pixels.

PROBABILITY OF UTILIZED INDUSTRIALIZATION

The semi-transmissive LCD disclosed herein can be utilized as a display in mobile terminals such as a cellular phone, a PDA, a gate machine, a digital camera or a like as well as terminals such as a laptop, a cache dispenser, an automatic vending machine.

What is claimed is:

1. A semi-transmissive liquid crystal display device comprising:
   a liquid crystal layer;
   a first substrate;
   a second substrate facing said first substrate via said liquid crystal layer sandwiched between said first substrate and said second substrate;
   a plurality of unit pixels arranged in a form of a matrix array, said unit pixels each including a transmissive region made up of a transmissive pixel electrode and a reflective region made up of a reflective pixel electrode;
   a plurality of first scanning lines each connected to a first switching element formed in each of the corresponding transmissive regions;
   a plurality of second scanning lines each connected to a second switching element formed in each of the corresponding reflective regions;
   a first common electrode formed in said unit pixels aligned in an odd-numbered column; and
   a second common electrode formed in said unit pixels aligned in an even-numbered column,
   wherein said first common electrode is electrically isolated from said second common electrode;
   wherein a first common signal applied to said first common electrode formed in said unit pixels aligned in the odd-numbered column is obtained by inverting a second common signal applied to said second common electrode formed in said unit pixels aligned in the even-numbered column; wherein a phase of an image signal applied to said pixel electrode is set different from a phase of said first or second common signal applied to said first or second common electrode; wherein a first period of time during which a first scanning signal applied to said first scanning line is selected, and a second period of time during which a second scanning signal applied to said second scanning lines is selected are set within one horizontal period; and wherein an ending of the first (or second) period of time for the first (or second) scanning signal applied to said first (or second) scanning line is set to a point in time before an electrical potential of said first or second common signal changes and an ending of the second (or first) period of time for the second (or first) scanning signal applied to said second (or first) scanning line is set to a point in time after an electrical potential of said first or second common signal changes.

2. The semi-transmissive liquid crystal display device according to claim 1, said plurality of said first scanning lines, said plurality of said second scanning lines, said transmissive pixel electrode for said transmissive region, said reflective pixel electrode for said reflective region, said first common electrode, and said second common electrode are formed on the same first substrate.

* * * * *